US011765453B2

(12) United States Patent
Kikuchi

(10) Patent No.: US 11,765,453 B2
(45) Date of Patent: *Sep. 19, 2023

(54) INFORMATION PROCESSING APPARATUS, IMAGE PICKUP APPARATUS, INFORMATION PROCESSING SYSTEM, INFORMATION PROCESSING METHOD, AND PROGRAM

(71) Applicant: Sony Group Corporation, Tokyo (JP)

(72) Inventor: Seigo Kikuchi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,043

(22) Filed: Feb. 8, 2022

(65) Prior Publication Data

US 2022/0174204 A1 Jun. 2, 2022

Related U.S. Application Data

(63) Continuation of application No. 16/892,559, filed on Jun. 4, 2020, now Pat. No. 11,265,453, which is a (Continued)

(30) Foreign Application Priority Data

Dec. 22, 2015 (JP) .................................. 2015-249608

(51) Int. Cl.
*H04N 23/66* (2023.01)
*H04N 5/77* (2006.01)
(Continued)

(52) U.S. Cl.
CPC ............. *H04N 23/66* (2023.01); *H04N 5/772* (2013.01); *H04N 23/63* (2023.01);
(Continued)

(58) Field of Classification Search
CPC .......... H04N 5/23203; H04N 5/23206; H04N 5/772; H04N 5/232411; H04N 5/23245; H04N 5/23293; H04N 5/23241
See application file for complete search history.

(56) References Cited

U.S. PATENT DOCUMENTS 7,339,610 B2 3/2008 Kusaka
11,265,453 B2 * 3/2022 Kikuchi ................. H04N 5/772
(Continued)

FOREIGN PATENT DOCUMENTS

CN 1199302 A 11/1998
CN 1829317 A 9/2006
(Continued)

OTHER PUBLICATIONS

Japanese Office Action dated Sep. 3, 2019 for corresponding Japanese Application No. 2015-249608 **.
(Continued)

*Primary Examiner* — Gevell V Selby
(74) *Attorney, Agent, or Firm* — Michael Best & Friedrich LLP

(57) ABSTRACT

An information processing apparatus comprises a communication unit configured to communicate with an external apparatus via a communication path, the communication path being selected from a first communication path and a second communication path, the first communication path being different from the second communication path. The apparatus also comprises an operation unit and a control unit. The control unit is configured to change an apparatus mode and to change a mode of communication performed by the communication unit, depending on a state of the operation unit.

20 Claims, 16 Drawing Sheets

Related U.S. Application Data continuation of application No. 15/763,599, filed as application No. PCT/JP2016/084542 on Nov. 22, 2016, now Pat. No. 10,757,313.

(51) Int. Cl.
*H04N 23/63* (2023.01)
*H04N 23/65* (2023.01)
*H04N 23/661* (2023.01)
*H04N 23/667* (2023.01)

(52) U.S. Cl.
CPC ......... *H04N 23/651* (2023.01); *H04N 23/661* (2023.01); *H04N 23/667* (2023.01)

(56) References Cited

U.S. PATENT DOCUMENTS

| | | |
|---|---|---|
| 2005/0128301 A1 | 6/2005 | Fujita |
| 2007/0058074 A1 | 3/2007 | Yamagishi |
| 2007/0103553 A1 | 5/2007 | Hara |
| 2010/0184387 A1 | 7/2010 | Mannami |
| 2013/0226985 A1 | 9/2013 | Naruse |
| 2013/0229685 A1 | 9/2013 | Naruse |
| 2014/0073244 A1 | 3/2014 | Ko et al. |
| 2015/0189150 A1 | 7/2015 | Morisawa |
| 2016/0182785 A1 | 6/2016 | Ogata et al. |
| 2017/0054839 A1 | 2/2017 | Ishikawa et al. |
| 2018/0074321 A1* | 3/2018 | Shimazu .................. H04N 5/64 |

FOREIGN PATENT DOCUMENTS

| | | |
|---|---|---|
| CN | 102970475 A | 3/2013 |
| CN | 103118282 A | 5/2013 |
| CN | 103905867 A | 7/2014 |
| EP | 2573741 A2 | 9/2013 |
| JP | 2006-279927 A | 10/2006 |
| JP | 2007-306201 A | 11/2007 |
| JP | 2013-068615 A | 4/2013 |
| JP | 2014027338 A | 2/2014 |
| JP | 2015-127920 A | 7/2015 |

OTHER PUBLICATIONS

Chinese Office Action dated Apr. 24, 2020 for corresponding Chinese Application No. 201680073832.3 **.
Japanese Office Action dated Apr. 7, 2020 for corresponding Japanese Application No. 2015-249608 **.
European Summons to Attend Oral Proceedings Pursuant to Rule 115(1) EPC dated Jul. 14, 2020 for corresponding European Application No. 15815972.1 **.
Japanese Office Action dated Sep. 3, 2019 for corresponding Japanese Application No. 2015-421608 **
Japanese Office Action dated Apr. 7, 2020 for corresponding Japanese Application No. 2015-2493608**.
European Summons to Attend Oral Proceedings Pursuant is Rule 115(1) EPC dated Jul. 14, 2020 for corresponding European Application No. 15381539172.1**.

* cited by examiner

| Icon | Meaning | Display mode |
|---|---|---|
| (1) | Wi-Fi connection information | Connection state / Non-connection state |
| (2) | Bluetooth (BT) connection information | Connection state / Non-connection state |
| (3) | Camera battery remaining amount information | Full remaining amount / No remaining amount |
| (4) | Remote control battery remaining amount information | Full remaining amount / No remaining amount |

FIG.3

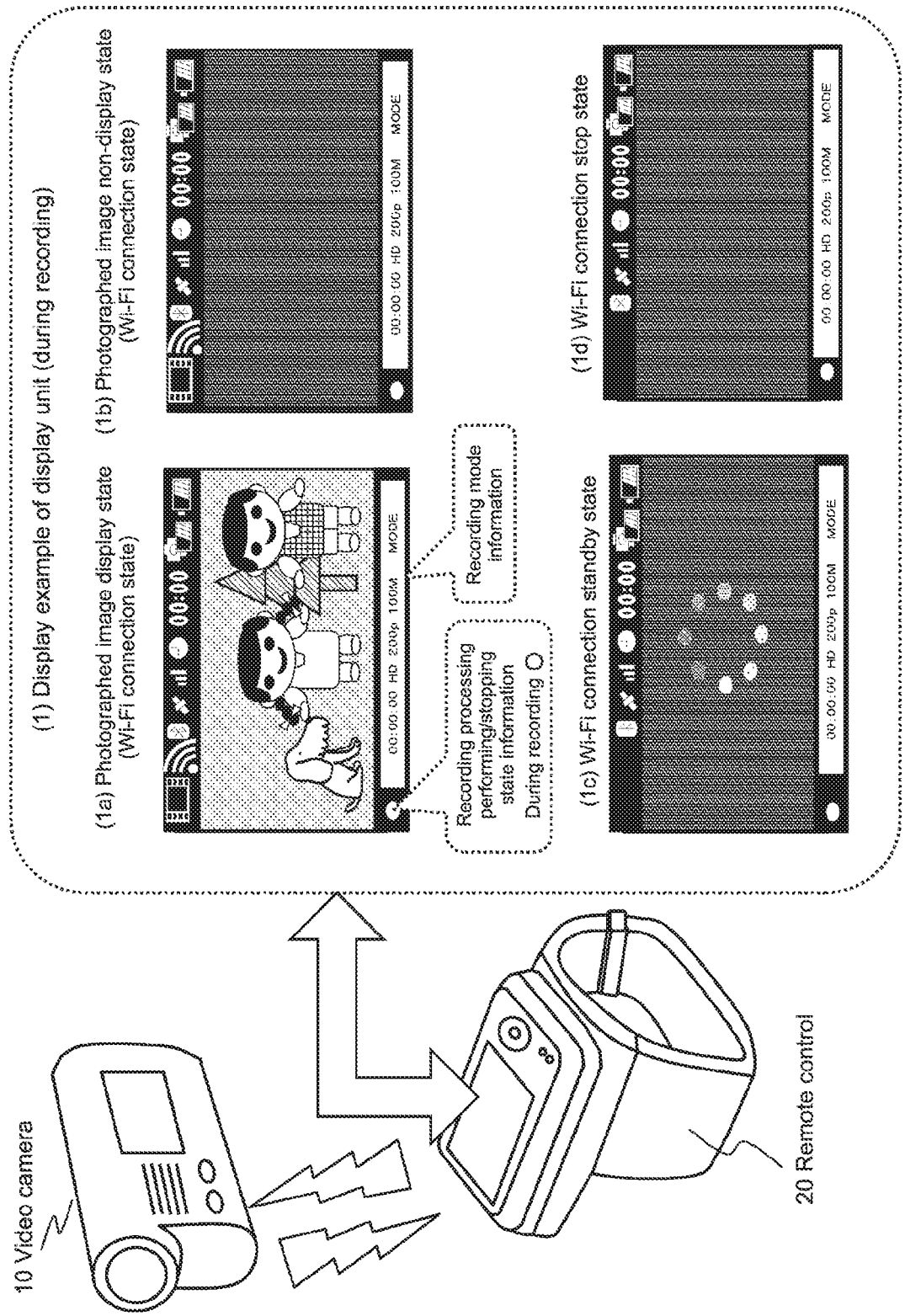

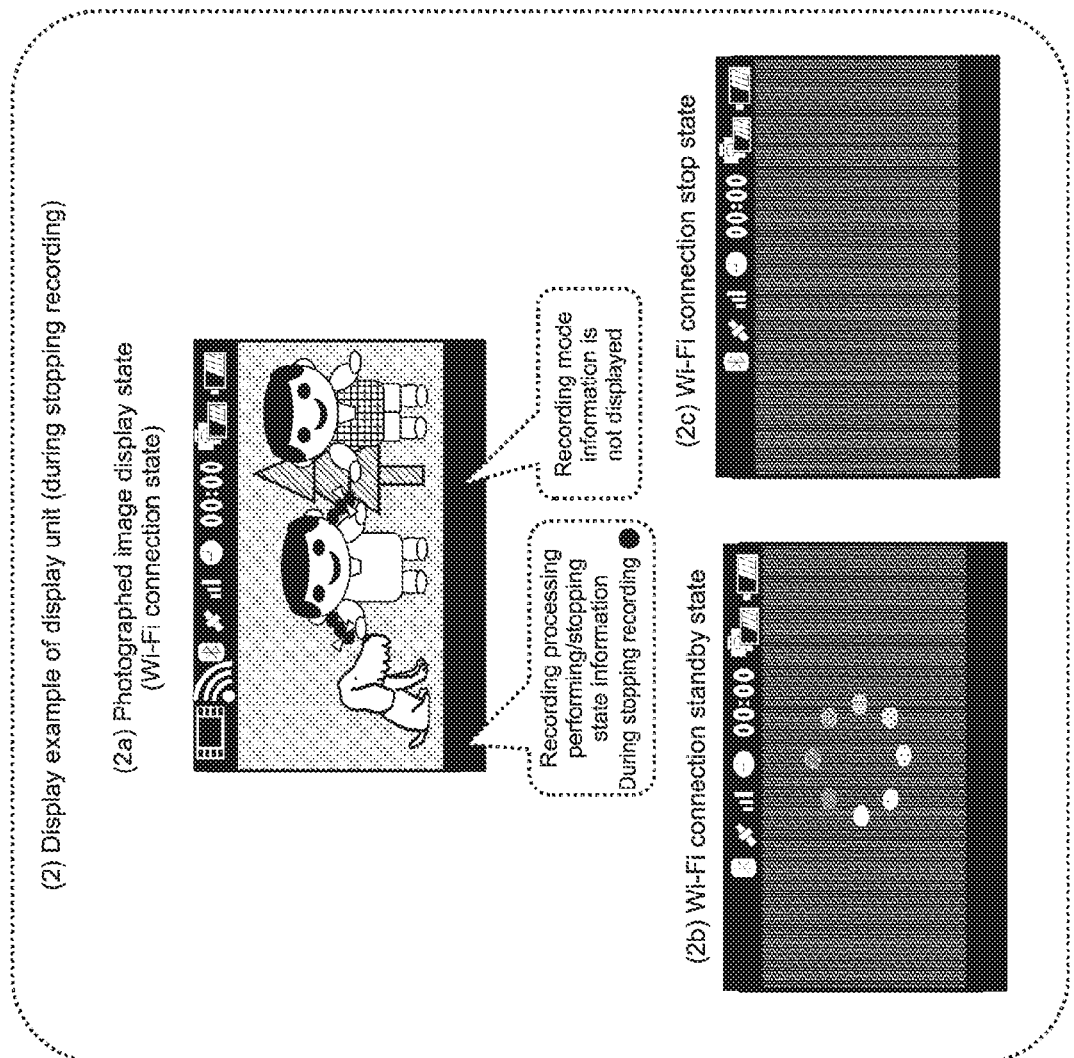
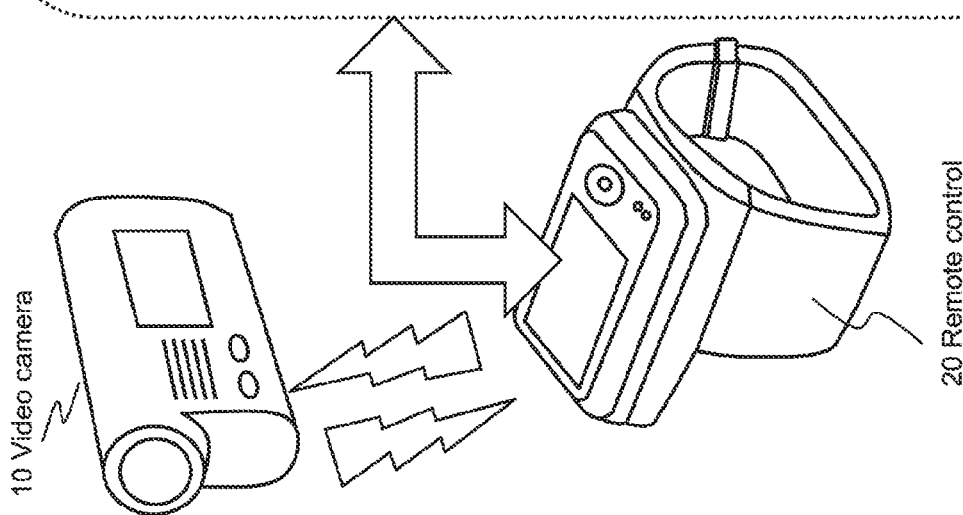
FIG.5

INFORMATION PROCESSING APPARATUS, IMAGE PICKUP APPARATUS, INFORMATION PROCESSING SYSTEM, INFORMATION PROCESSING METHOD, AND PROGRAM

CROSS REFERENCE TO RELATED APPLICATIONS

This application is a continuation application of U.S. patent application Ser. No. 16/892,559, filed Jun. 4, 2020 which is a Continuation application of U.S. patent application Ser. No. 15/763,599, filed Mar. 27, 2018 and issued as U.S. Pat. No. 10,757,313 on Aug. 25, 2020, which claims the benefit of Japanese Priority Patent Application JP 2015-249608 filed Dec. 22, 2015, the entire contents of which are incorporated herein by reference.

TECHNICAL FIELD

The present disclosure relates to an information processing apparatus, an image pickup apparatus, an information processing system, an information processing method, and a program. In more detail, the present disclosure relates to an information processing apparatus, an image pickup apparatus, an information processing system, an information processing method, and a program that control pickup processing or image display processing performed by a camera with a remote control operation.

BACKGROUND ART

In recent years, a digital camera or digital video camera has been reduced in size and weight, and a camera having a communication function is increasingly used and developed.

For example, there is a system in which a display for image display is provided to a remote control that is capable of intercommunicating with a camera, starting or stopping of pickup performed by the camera is controlled with a remote control operation, and the picked up image can be displayed on the display of the remote control.

Note that examples of the related art that has disclosed a system in which a remote control is used to be capable of controlling the camera operation include. Patent Literature 1.

In the system in which a camera is controlled with a remote control, it is possible to transfer, to the remote control, an image picked up by the camera, and to display the image on the display of the remote control, and the user who is the operator of the remote control can issue instructions of starting or stopping of image recording processing.

The camera and the remote control are each equipped with a battery, and supplied with a power source from the battery to perform various kinds of data processing such as image pickup processing, image display processing, and communication processing between the remote control and the camera.

However, the image transfer, image display processing, and other data communication processing consume a lot of electricity. On the other hand, the capacity of the battery mounted on the camera or remote control is limited.

Therefore, it is expected to reduce power consumption as much as possible.

CITATION LIST

Patent Literature

[PTL 1]
Japanese Patent Application Laid-open No. 2015-127920

SUMMARY

Technical Problem

In view of the circumstances as described above, it is desirable to provide an information processing apparatus, an image pickup apparatus, an information processing system, an information processing method, and a program that achieve reduction in power consumption in the system in which a remote control is used to control the camera operation, for example.

Solution to Problem

According to a first embodiment of the present disclosure, there is provided an information processing apparatus, including: a communication unit configured to communicate with an external apparatus via a communication path, the communication path being selected from different communication paths; an operation unit; and a control unit configured to change an apparatus mode depending on an operation state of the operation unit, and to change, in response to the change of the apparatus mode, a mode of communication performed by the communication unit.

In one example, an information processing apparatus comprises a communication unit configured to communicate with an external apparatus via a communication path, the communication path being selected from a first communication path and a second communication path, the first communication path being different from the second communication path. The apparatus also comprises an operation unit and a control unit. The control unit is configured to change an apparatus mode and to change a mode of communication performed by the communication unit, depending on a state of the operation unit.

The operation state includes a state in which the operation unit is being operated and a state in which there is an absence of input to the operation unit for a predetermined time or more. In the state in which there is an absence of input to the operation unit for a predetermined period of time, it is considered that the operation unit is not being operated by the user for a sufficient amount of time, in support of updating apparatus modes and modes of communication.

According to a second embodiment of the present disclosure, there is provided an image pickup apparatus, including: an image pickup unit that picks up an image; a communication unit configured to communicate with a remote control via a communication path, the communication path being selected from different communication paths; and a control unit configured to change an apparatus mode depending on an operation state of an operation unit of the remote control, and to change, in response to the change of the apparatus mode, a mode of communication performed by the communication unit.

According to a third embodiment of the present disclosure, there is provided an information processing system, including: an image pickup unit; and a remote control apparatus that controls the image pickup apparatus, the remote control apparatus including a communication unit configured to communicate with the image pickup apparatus via a communication path, the communication path being selected from different communication paths, an operation unit, and a control unit configured to change an apparatus mode depending on an operation state of the operation unit, and to change, in response to the change of the apparatus mode, a mode of communication performed by the communication unit, the image pickup apparatus including a communication unit configured to communicate with the remote control apparatus via a communication path, the communication path being selected from different communication paths, and a control unit configured to change an apparatus mode depending on the operation state of the operation unit of the remote control apparatus, and to change, in response to the change of the apparatus mode, a mode of communication performed by the communication unit.

According to a fourth embodiment of the present disclosure, there is provided an information processing method, which is executed by an information processing apparatus that includes a communication unit, an operation unit, and a control unit, including: communicating, by the communication unit, with an external apparatus via a communication path, the communication path being selected from different communication paths; changing, by the control unit, an apparatus mode depending on an operation state of the operation unit; and changing, by the control unit in response to the change of the apparatus mode, a mode of communication performed by the communication unit.

According to a fifth embodiment of the present disclosure, there is provided an information processing method, which is executed by an image pickup apparatus that includes an image pickup unit, a communication unit, and a control unit, including: picking up, by the image pickup unit, an image; communicating, by the communication unit, with a remote control via a communication path, the communication path being selected from different communication paths; changing, by the control unit, an apparatus mode depending on an operation state of an operation unit of the remote control; and changing, by the control unit in response to the change of the apparatus mode, a mode of communication performed by the communication unit.

According to a sixth embodiment of the present disclosure, there is provided a program that causes an information processing apparatus to execute information processing, the information processing apparatus including, a communication unit configured to communicate with an external apparatus via a communication path, the communication path being selected from different communication paths; an operation unit; and a control unit configured to change an apparatus mode depending on an operation state of the operation unit, and to change, in response to the change of the apparatus mode, a mode of communication performed by the communication unit.

According to a seventh embodiment of the present disclosure, there is provided a program that causes an image pickup apparatus to execute information processing, the image pickup unit including, an image pickup unit configured to pick up an image; a communication unit configured to communicate with a remote control via a communication path, the communication path being selected from different communication paths; and a control unit configured to change an apparatus mode depending on an operation state of an operation unit of the remote control, and to change, in response to the change of the apparatus mode, a mode of communication performed by the communication unit.

Note that, examples of the program according to the seventh embodiment of the present disclosure include a program that can be provided, for example, from a recording medium or a communication medium in a computer-readable form to an information processing apparatus, a computer, and a system that are capable of executing various programs and codes. By providing such a program in a computer-readable form, processing in accordance with the program is achieved on an information processing apparatus, a computer, and a system.

These and other objects, features and advantages of the present disclosure will become more apparent in light of the following detailed description on the basis of the embodiments of the present disclosure to be described later or the accompanying drawings. Note that, the "system" in this specification refers to a logical collective configuration of a plurality of apparatus, and those apparatus having respective configurations are not necessarily provided in the same casing.

Advantageous Effects

According to the configuration of an embodiment of the present disclosure, it is possible to achieve reduction in power consumption by changing the communication mode depending on the set mode in a communication apparatus that uses a plurality of communication paths together.

Specifically, in an information processing system including an image pickup apparatus and a remote control apparatus that controls the image pickup apparatus, for example, a communication unit of the image pickup apparatus and a communication unit of the remote control apparatus are configured to communicate with each other through communication, the communication being selected from Wi-Fi communication and Bluetooth (BT: registered trademark) communication, and a control unit of the image pickup apparatus and a control unit of the remote control apparatus stop the Wi-Fi communication and communicate with each other via only through the BT communication when the operation unit of the remote control apparatus is unoperated for a predetermined time period or more.

According to this configuration, it is possible to achieve reduction in power consumption by changing the communication mode depending on the set mode in a communication apparatus that uses a plurality of communication paths together.

Note that the effects described in the specification are merely examples. The effects are not limited to the effects described in the specification. Further, the present disclosure may have effects other than the exemplified effects.

BRIEF DESCRIPTION OF DRAWINGS

FIG. 3 is a diagram explaining icons being the display data shown on the display unit of the remote control.

FIG. 4 is a diagram explaining an example of the display data shown on the display unit of the remote control.

FIG. 5 is a diagram explaining an example of the display data shown on the display unit of the remote control.

DESCRIPTION OF EMBODIMENTS

Figure 1:
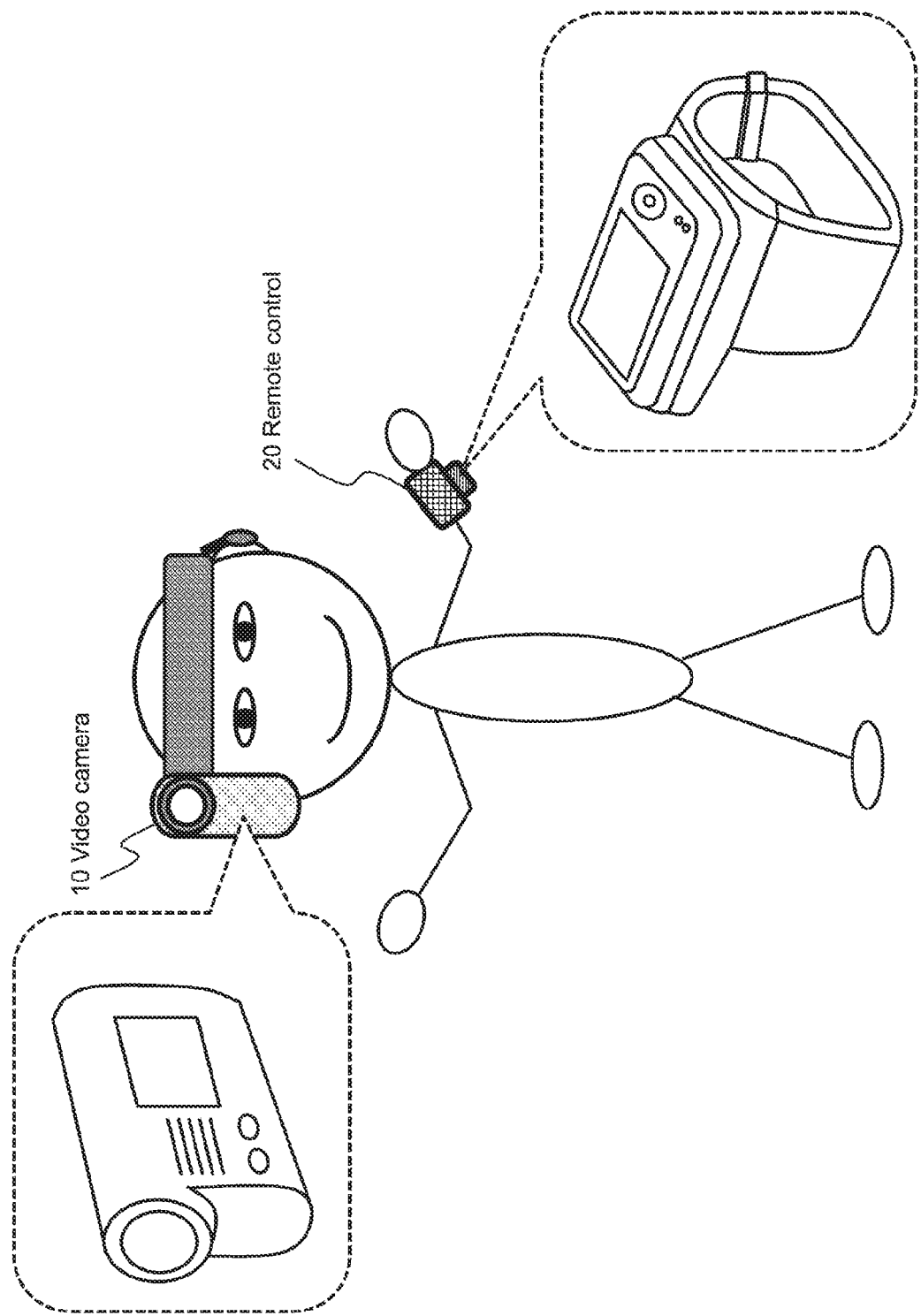
FIG. 1 is a diagram explaining an example in which a video camera and a remote control are used.

Hereinafter, details of the information processing apparatus, the image pickup apparatus, the information processing system, the information processing method, and the program according to the embodiment of the present disclosure will be described with reference to the drawings. Note that a description will be made in the following order.
1. Regarding configuration example of information processing system including camera that can be operated by remote control
2. Regarding Wi-Fi communication and Bluetooth (BT) communication
3. Regarding communication processing between video camera and remote control and mode transition
4. Regarding state transition and mode transition in remote control
5. Regarding state transition and mode transition in video camera
6. Regarding transition sequence of display data shown on display unit of remote control
7. Regarding another embodiment
8. Regarding configuration of information processing apparatus
9. Summary of configuration of present disclosure 1. Regarding Configuration Example of Information Processing System Including Camera that can be Operated by Remote Control A configuration example of an information processing system including a camera that can be operated by a remote control will be described first.

FIG. 1 is a diagram explaining an example in which a camera that can be operated by a remote control is used.

A recent camera or video camera is reduced in size and weight. As shown in FIG. 1, the user (photographer) can take an image without feeling the weight of the camera so much even if the user wears the camera as if the camera is fixed to the body (e.g., head) of the user.

However, if the user wears a video camera 10 on his/her head as shown in FIG. 1, it may be impossible for the user to operate an operation unit of the main body of the video camera 10 and see a display image shown on a display unit of the main body of the video camera 10.

It is possible to use a remote control 20 equipped with a display unit (monitor) shown in FIG. 1 to perform processing such as starting or stopping of pickup performed by the video camera 10 and confirmation of the picked up image. The user wears the remote control 20 on his/her arm.

The video camera 10 and the remote control 20 each include, for example, a communication unit configured to perform Wi-Fi communication, Bluetooth (BT: registered trademark) communication, or the like, and are configured to be capable of communicating an image or various kinds of data such as operation information and state information (status) with each other.

Figure 2:
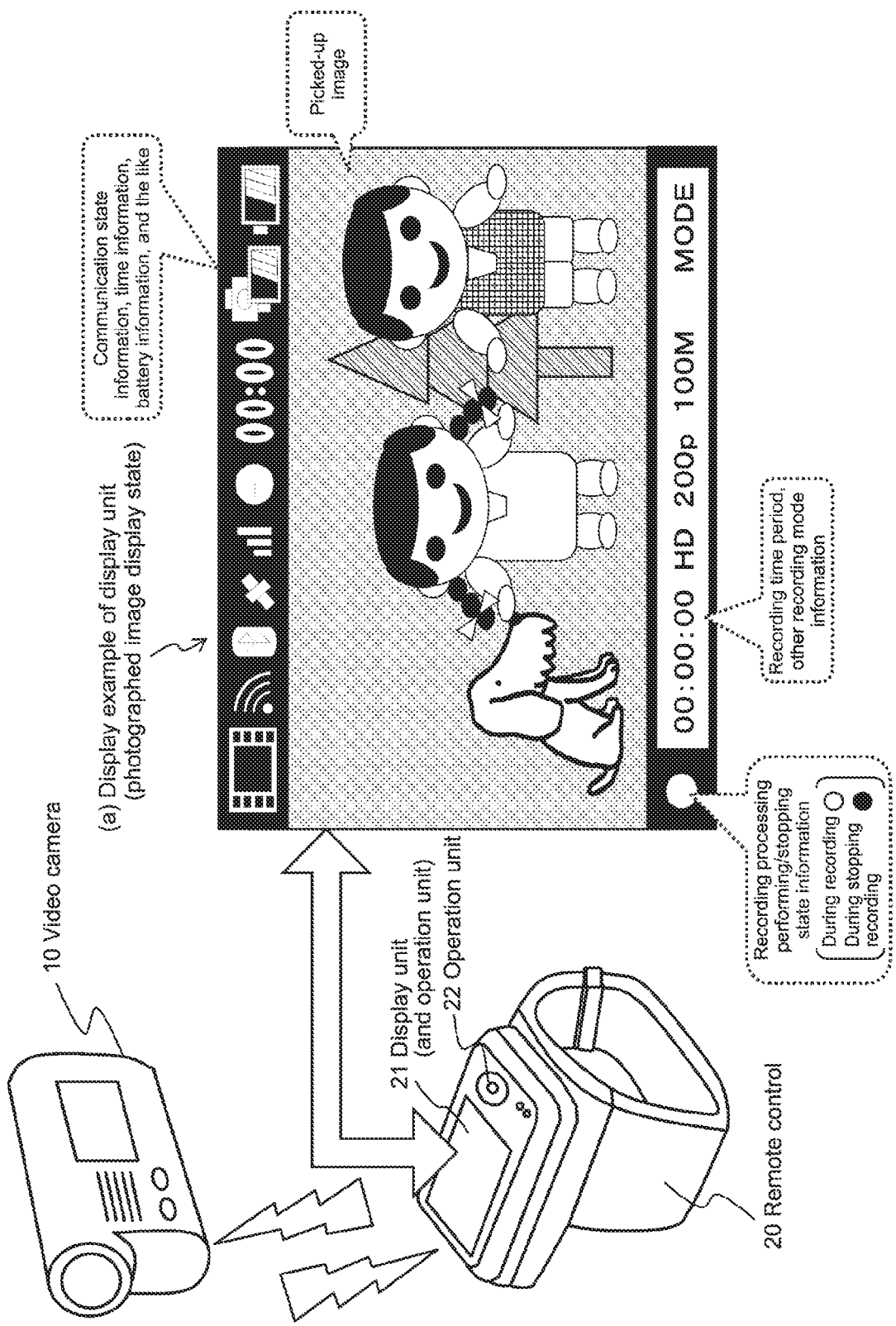
FIG. 2 is a diagram explaining an example of display data shown on a display unit of the remote control.

FIG. 2 shows a configuration of the remote control 20 and a display example of a display unit 21 of the remote control 20.

As shown in FIG. 2, the remote control 20 includes the display unit 21 and an operation unit 22. The display unit 21 is configured to be used also as a touch panel type operation unit.

On the display unit 21, display data shown in (a) part of FIG. 2 is displayed, for example.

The display example of the display unit 21 shown in the (a) part of FIG. 2 shows the display state of the image picked up by the video camera 10.

On the center display area of the display unit, an image picked up via an image pickup unit of the video camera 10. Note that on the display unit 21, it is possible to display an image picked up via the image pickup unit of the video camera 10 even during performing or stopping recording processing.

The user (photographer) can control pickup performed by the video camera 10 while seeing the display image shown on the display unit 21, for example. The pickup includes starting or stopping of recording processing and pickup of a still image. The processing can be performed by operating the operation unit 22.

The operation information of the operation unit 22 is transmitted from a communication unit of the remote control 20 to a communication unit of the video camera 10. A control unit of the video camera 10 performs processing depending on the received operation information.

Note that it is also possible to display a user interface (UI) including an operation button for these operations or the like on the display unit 21 of the remote control 20, and to input an instruction of starting or stopping of image pickup by, for example, operating (touching) the UI.

As shown in the (a) part in FIG. 2, not only the picked up image but also various kinds of information are displayed on the display unit 21. The various kinds of information are displayed, for example, at upper and lower portions of the display area of the display unit 21.

For example, on the upper area of the display unit 21, communication state information, time information, battery state information, and the like are displayed. The communication state information relates to Wi-Fi communication and Bluetooth (BT: registered trademark) communication, and represents communication state with the video camera 10.

On the other hand, on the lower area of the display unit 21, recording processing performing/stopping state information, recording time period information, recorded image quality information, and other recording mode information are displayed.

In the example shown in FIG. 2, the recording processing performing/stopping state information is shown by using a recording performing/stopping identification lamp. The lamp is set to turn on (white circle) during recording and turn off (black circle) during stopping recording.

An example of the display mode of a part of icons displayed on the upper portion of the display example of the display unit 21 shown in the (a) part in FIG. 2 will be described with reference to FIG. 3.

FIG. 3 shows the following icons.
(1) Wi-Fi connection information
(2) Bluetooth (BT: registered trademark) connection information
(3) Camera battery remaining amount information
(4) Remote control battery remaining amount information These are a part of icons displayed on the upper portion of the display unit 21 of the remote control 20 shown in FIG. 2.

As shown in FIG. 3, the icon of the (1) Wi-Fi connection information is set to be displayed in the Wi-Fi connection state in which Wi-Fi communication is possible between the remote control 20 and the video camera 10.

On the other hand, the icon is not displayed in the Wi-Fi non-connection state in which Wi-Fi communication is not possible between the remote control 20 and the video camera 10.

Similarly to (1) Wi-Fi connection information, as shown in FIG. 3, the icon of the (2) Bluetooth (BT: registered trademark) connection information is set to be displayed in the BT connection state in which BT communication is possible between the remote control 20 and the video camera 10.

On the other hand, the icon is not displayed in the BT non-connection state in which BT communication is not possible between the remote control 20 and the video camera 10.

The (3) Camera battery remaining amount information represents the battery remaining amount of the battery attached to the video camera 10. As shown in FIG. 3, the display mode of the battery-like icon is changed depending on the battery remaining amount.

The (4) Remote control battery remaining amount information represents the battery remaining amount of the battery attached to the remote control 20. As shown in FIG. 3, the display mode of the battery-like icon is changed depending on the battery remaining amount.

The remote control 20 acquires information necessary for the state display including information relating to the remote-controller and information relating to the video camera. The remote control 20 acquires the information relating to the remote-controller from the inside of the remote control 20. The remote control 20 acquires the information relating to the video camera based on communication data from the video camera 10. The remote control 20 receives the information on the video camera 10 through Wi-Fi communication or BT communication at any time, and performs display based on the received information.

The display example of the display unit 21 of the remote control 20 will be described with reference to FIGS. 4 and 5.

FIG. 4 shows a plurality of display examples of the display unit 21 of the remote control 20 in the case where recording processing is performed in the video camera 10.

In FIG. 4, display examples of the following four states are shown.
(1a) Picked up image display state (Wi-Fi connection state)
(1b) Picked up image non-display state (Wi-Fi connection state)
(1c) Wi-Fi connection standby state
(1d) Wi-Fi connection stop state The (1a) picked up image display state (Wi-Fi connection state) is a state where Wi-Fi connection is established between the video camera 10 and the remote control 20, an image picked up by the video camera 10 (=recording processing image) is transmitted to the remote control 20 through Wi-Fi communication, and the image is displayed on the center area of the display unit 21 of the remote control 20.

Further, on the lower portion of the display unit 21, the recording performing lamp is turned on, and the recording mode information is displayed.

On the upper portion of the display unit, the Wi-Fi icon and the BT icon are displayed, representing that Wi-Fi connection and BT connection between the video camera 10 and the remote control 20 are valid and the Wi-Fi communication and BT communication are being performed.

The (1b) picked up image non-display state (Wi-Fi connection state) is a state where Wi-Fi connection is established between the video camera 10 and the remote control 20 but transmission of an image picked up by the video camera 10 (=recording processing image) to the remote control 20 through Wi-Fi communication is stopped. The image is not displayed on the center area of the display unit 21 of the remote control 20.

In the configuration of the embodiment of the present disclosure, in order to reduce power consumption, transmission of an image from the video camera 10 to the remote control 20 is stopped and image display processing on the remote control 20 is stopped even if recording processing is being performed by the video camera 10 under predefined conditions, e.g., in the case where the remote control 20 unoperated by the user for a predetermined time period or more.

By performing such image transmission stopping processing or display stopping processing, it is possible to reduce the consumption of the battery mounted on the video camera 10 or the remote control 20, and to achieve electric power saving.

The conditions for the image transmission stopping processing and the display stopping processing will be described later in detail.

Also in the picked up image non-display state, the recording performing lamp is turned on and the recording mode information is displayed on the lower portion of the display unit 21.

On the upper portion of the display unit, the Wi-Fi icon and the BT icon are displayed, representing that Wi-Fi connection and BT connection between the video camera 10 and the remote control 20 are valid and the Wi-Fi communication and BT communication are being performed.

The user can make sure that recoding is being performed or communication is maintained, on the basis of these pieces of information.

Note that if the user performs an operation such as an operation of the operation unit of the remote control 20 and a touch operation of the display unit 21 having a function as a touch panel in the "(1b) picked up image non-display state (Wi-Fi connection state)," the remote control 20 interprets the operation information as a request for image display, and a request for image transmission is output from the remote control 20 to the video camera 10.

In the case where the video camera 10 receives the request from the remote control 20, the video camera 10 starts the image transmission processing.

By this processing, transition processing for making a transition to the state from the "(1b) picked up image non-display state (Wi-Fi connection state)" shown in FIG. 4 to the "(1a) picked up image display state (Wi-Fi connection state)" shown in FIG. 4 is performed.

The series of transition processing will be described later in detail.

The (1c) Wi-Fi connection standby state represents the display example of the display unit 21 in which Wi-Fi connection is not established between the video camera 10 and the remote control 20 but the state is making a transition to the connection state.

The Wi-Fi connection icon is not displayed.

It should be noted that the recording lamp is turned on, and the recording processing is continued.

In the case where Wi-Fi connection is established in the "(1c) Wi-Fi connection standby state," the state makes a transition to "(1a) picked up image display state (Wi-Fi connection state)" shown in FIG. 4.

The "(1c) Wi-Fi connection standby state" represents a display example in the case where Wi-Fi connection is temporarily stopped during the recording processing performed by the video camera 10, for example.

In such a case, Wi-Fi connection between the remote control and the video camera is tried to be established while continuing the recording processing performed by the video camera 10, the state makes a transition to the "(1a) picked up image display state (Wi-Fi connection state)" shown in FIG. 4 if the connection is restored, and thus, the recording processing is continued.

The (1d) Wi-Fi connection stop state represents a display example of the display unit 21 in the state where Wi-Fi connection is not established between the video camera 10 and the remote control 20 and connection attempt processing is not also performed.

The Wi-Fi connection icon is not displayed

It should be noted that the recording lamp is turned on and the recording processing is continued.

In the system according to the embodiment of the present disclosure, a mode in which Wi-Fi communication is voluntarily stopped between the video camera 10 and the remote control 20 and only BT communication is continued (BT single communication mode) is set as an electric power saving mode.

In the BT single communication mode, Wi-Fi communication between the video camera 10 and the remote control 20 is stopped and transmission of a picked up image through the Wi-Fi communication is also stopped.

In the configuration of the embodiment of the present disclosure, in order to reduce power consumption, the Wi-Fi communication between the video camera 10 and the remote control 20 is stopped, transmission of a picked up image is also stopped, and minimum information is transmitted/received by using BT communication even if recording processing is being performed by the video camera 10 under predefined conditions, e.g., in the case where the remote control 20 unoperated by the user for a predetermined time period or more. This mode is referred to as the BT single communication mode.

By using the BT single communication mode, it is possible to further reduce the consumption of the battery mounted on the video camera 10 or the remote control 20, and to achieve electric power saving.

The mode transition processing will be described later in detail.

Note that also in the (1d) Wi-Fi connection stop state shown in FIG. 4, the recording performing lamp is turned on and the recording mode information is displayed on the lower portion of the display unit 21, and thus, the user can recognize that the recording processing is continued.

It should be noted that the Wi-Fi icon on the upper portion of the display unit is turned off, and the BT icon is displayed.

Only the BT communication is valid between the video camera 10 and the remote control 20, representing that the Wi-Fi communication is not possible but the BT communication is being performed.

The user can make sure that recoding is being performed and confirm the communication state, on the basis of these pieces of information.

Note that if the user performs an operation such as an operation of the operation unit of the remote control 20 and a touch operation of the display unit 21 having a function as a touch panel in the "(1d) Wi-Fi connection stop state," the remote control 20 interprets the operation information as a request for image display, performs processing for restoring Wi-Fi connection between the remote control 20 and the video camera 10, and outputs a request for image transmission to the video camera 10.

In the case where the video camera 10 receives the request from the remote control 20, the video camera 10 starts image transmission processing via a reconnected Wi-Fi communication path.

By this processing, transition processing for making a transition from the (1d) Wi-Fi connection stop state shown in FIG. 4 to "(1a) picked up image display state (Wi-Fi connection state)" shown in FIG. 4 is performed.

The series of transition processing will be described later in detail.

Next, a display example in the case where the recording processing is not performed by the video camera 10 will be described as a display example of the display unit 21 of the remote control 20 with reference to FIG. 5.

FIG. 5 shows a plurality of display examples of the display unit 21 of the remote control 20 in the case where the recording processing is not performed by the video camera 10.

In FIG. 5, display examples of the following three states are shown.

(2a) Picked up image display state (Wi-Fi connection state)
(2b) Wi-Fi connection standby state
(2c) Wi-Fi connection stop state Note that even if the recording processing is not performed by the video camera 10, an image is taken in via the image pickup unit of the video camera 10 and the image is transmitted from the video camera 10 to the remote control 20 as long as the power source of the video camera 10 is on.

The (2a) picked up image display state (Wi-Fi connection state) represents the state where Wi-Fi connection is established between the video camera 10 and the remote control 20, an image picked up by the video camera 10 (=on which recording processing is not performed) is transmitted to the remote control 20 through Wi-Fi connection, and the image is displayed on the center area of the display unit 21 of the remote control 20.

In this case, however, the recording performing lamp on the lower portion of the display unit 21 is turned off, and the recording mode information is not displayed.

The user can identify that the display image is not recorded, on the basis of these pieces of information.

On the upper portion of the display unit, the Wi-Fi icon and the BT icon are displayed, representing that Wi-Fi connection and BT connection between the video camera 10 and the remote control 20 are valid and the Wi-Fi communication and BT communication are being performed.

The (2b) Wi-Fi connection standby state represents the display example of the display unit 21 in which Wi-Fi connection is not established between the video camera 10 and the remote control 20 but the state is making a transition to the connection state.

The Wi-Fi connection icon is not displayed.

The recording lamp is turned off, and the recording processing is not being performed.

In the case where Wi-Fi connection is established in the (2b) Wi-Fi connection standby state, the state makes a transition to the (2a) picked up image display state (Wi-Fi connection state) shown in FIG. 5.

The (2b) Wi-Fi connection standby state represents a display example in the case where Wi-Fi connection is temporarily stopped while the picked up image of the (2a) part in FIG. 5 is displayed in the video camera 10, for example.

In such a case, Wi-Fi connection between the remote control and the video camera is tried to be established while stopping the recording processing performed by the video camera 10, the state makes a transition to the "(2a) picked up image display state (Wi-Fi connection state)" shown in FIG. 5 if the connection is restored, and the picked up image is displayed.

The (2c) Wi-Fi connection stop state represents a display example of the display unit 21 in the state where Wi-Fi connection is not established between the video camera 10 and the remote control 20 and connection attempt processing is not also performed.

The Wi-Fi connection icon is not displayed

The recording lamp is turned off, and the recording processing is not being performed.

As described above with reference to FIGS. 4 and 5, the display mode of the display unit 21 of the remote control 20 is changed to different display modes depending on the state.

The display transition processing will be described later in detail.

2. Regarding Wi-Fi Communication and Bluetooth (BT) Communication

Next, the Wi-Fi connection and Bluetooth (BT: registered trademark) connection performed between the video camera 10 and the remote control 20 will be described.

Figure 7:
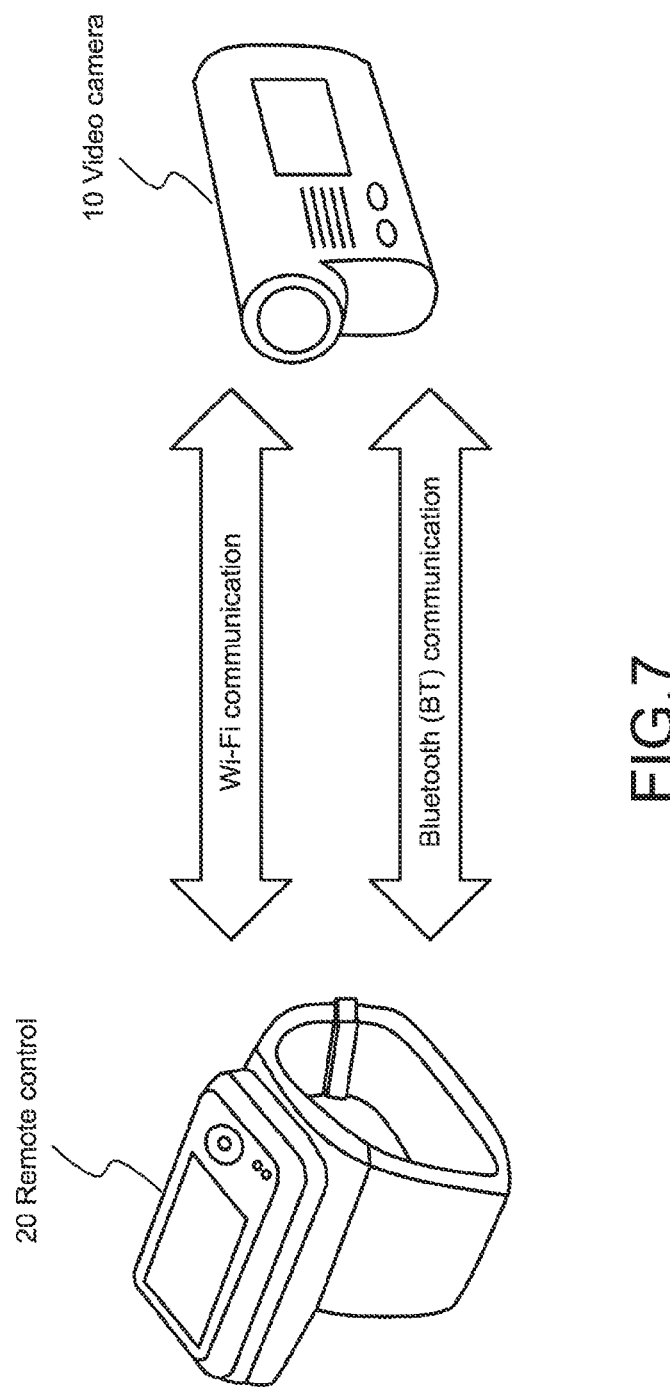
FIG. 7 is a diagram explaining an example of communication between the video camera and the remote control.

As shown in FIG. 7, the video camera 10 and the remote control 20 each include a communication unit, and Wi-Fi communication and BT communication are performed by the communication units.

Wi-Fi communication standards include a plurality of standards such as IEEE802.11a/b/g/n.

Two kinds of bands of 2.4 GHz and 5 GHz can be selected to perform the Wi-Fi communication. The Wi-Fi communication has features that it has a wide band, relatively-high communication speed, and relatively large (about 100 m) communication enable distance, and is capable of reliably communicating large data.

On the other hand, only one band of 2.4 GHz can be used for the BT communication. The BT communication has features that it has a communication speed lower than that of the Wi-Fi communication and a communication enable distance (about 10 m) lower than that of the Wi-Fi communication.

However, the BT communication has a merit that the power consumption is lower than that of the Wi-Fi communication.

Also for the BT communication, there exist a plurality of standards. Examples of the BT communication standards include BTLE (Bluetooth (registered trademark) Low Energy) standard whose power consumption is lower than that of the existing BT communication. "BTLE" is referred to as "BLE" in some cases.

The Bluetooth (BT) described in the specification includes not only the existing BT communication but also BT communication in accordance with the BTLE standard.

Figure 8:
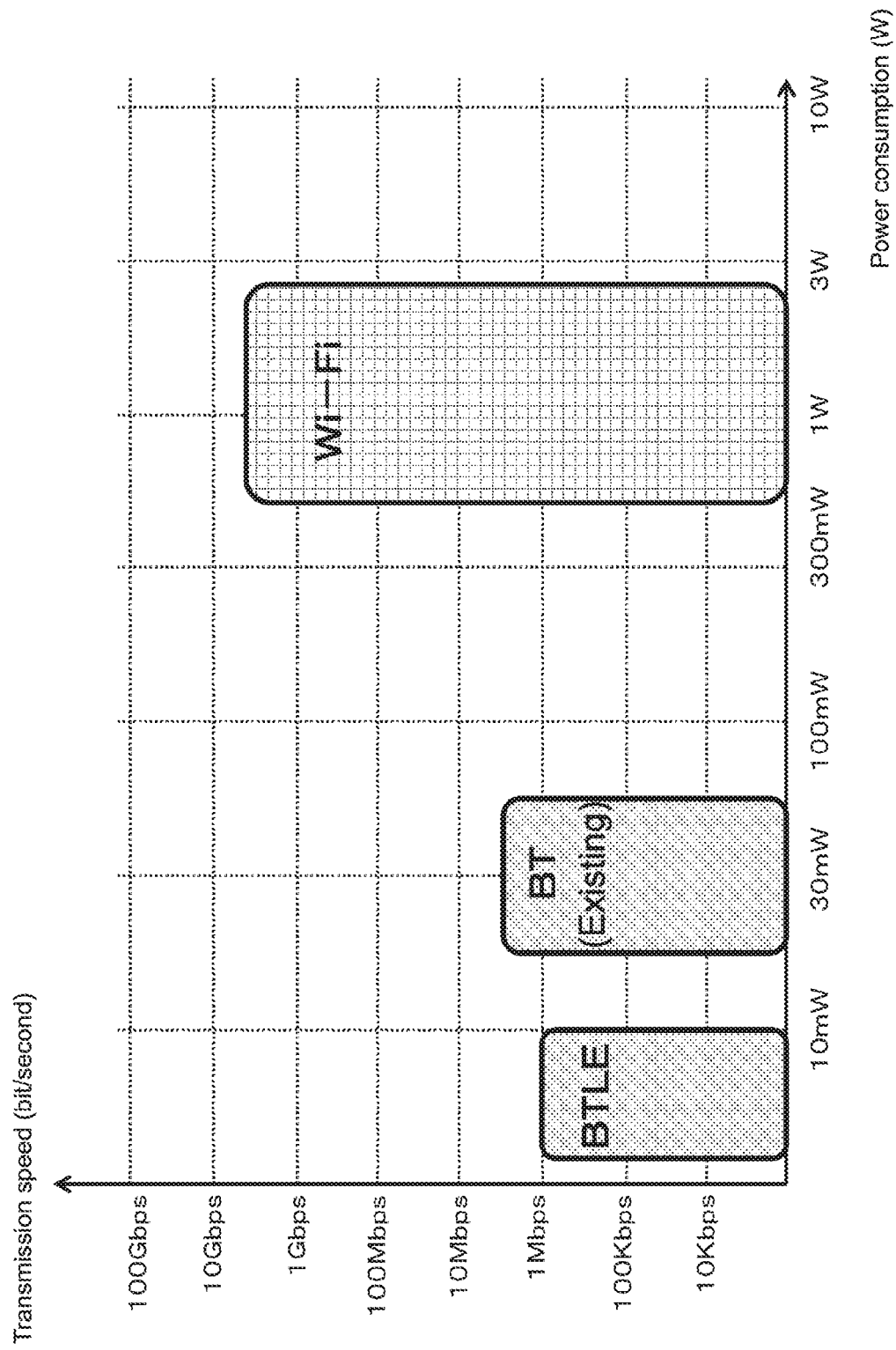
FIG. 8 is a diagram explaining features of Wi-Fi communication and Bluetooth (BT) communication.

FIG. 8 is a diagram showing the power consumption and the transmission speed of the Wi-Fi communication, the BT (existing) communication, and the BTLE communication.

As shown in FIG. 8, the Wi-Fi communication has a high transmission speed but the power consumption thereof is high.

On the other hand, the BT communication and the BTLE communication have a low transmission speed but the power consumption thereof is low.

In the system according to the embodiment of the present disclosure, it is possible to achieve electric power saving by using the Wi-Fi communication and the BT communication together between the video camera 10 and the remote control 20 and controlling the Wi-Fi communication and the BT communication.

3. Regarding Communication Processing Between Video Camera and Remote Control and Mode Transition Next, communication processing performed between the video camera 10 and the remote control 20 according to the embodiment of the present disclosure and mode transition will be described with reference to FIG. 9 and subsequent figures.

Figure 9:
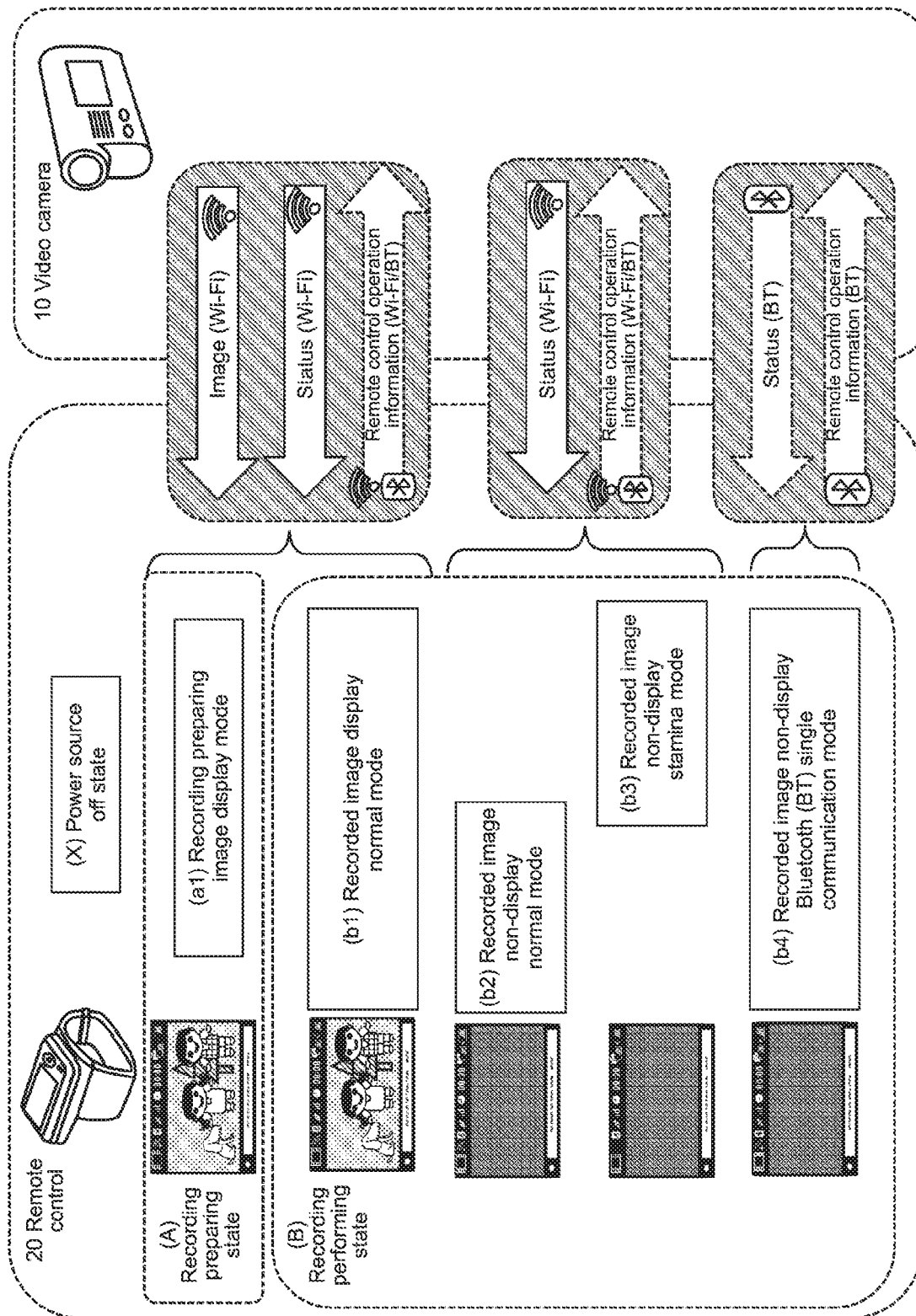
FIG. 9 is a diagram explaining an example in which modes of communication between the video camera and the remote control are set depending on the mode.

FIG. 9 is a diagram explaining a plurality of states and modes set in the remote control 20 and the communication modes between the remote control 20 and the video camera 10 in each of the states or modes.

As shown in FIG. 9, the state of the remote control 20 makes a transition to three states of (X) power source off state, (A) recording preparing state, and (B) recording performing state.

Further, the mode of the remote control 20 is set to the (a1) recording preparing image display mode in the (A) recording preparing state.

The mode of the remote control 20 is set to any one of four modes of (b1) recorded image display normal mode, (b2) recorded image non-display normal mode, (b3) recorded image non-display stamina mode, and (b4) recorded image non-display Bluetooth (BT) single communication mode in the (B) recording performing state.

The remote control 20 performs transition between different modes in accordance with a user's operation or under predetermined mode transition conditions.

As shown in FIG. 9, the mode of communication performed between the remote control 20 and the video camera 10 corresponding to each mode is defined, and the communication mode may be changed depending on the mode transition.

In the case where the mode of the remote control 20 is set to any one of the following two modes, i.e., the (a1) recording preparing image display mode and (b1) recorded image display normal mode, an image and status information are transmitted from the video camera 10 to the remote control 20 through Wi-Fi communication, and the operation information of the remote control 20 is transmitted to the video camera 10 by using Wi-Fi communication and BT communication.

The image data transmitted from the video camera 10 through Wi-Fi communication is a picked up image that is not being recorded in the (a1) recording preparing image display mode, and a picked up image being recorded (recorded image) in the (b1) recorded image display normal mode.

The status information transmitted from the video camera 10 through Wi-Fi communication includes, for example, information relating to whether or not recording is performed, picked up image quality (e.g., HD and SD) information, recording time period information, and battery remaining amount information of the battery attached to the video camera.

The operation information of the remote control 20 is transmitted to the video camera 10 by using Wi-Fi communication and BT communication. Of the Wi-Fi communication path and the BT communication path, a communication path through which the operation information is transmitted is determined depending on the operation type in advance.

For example, power source ON/OFF information of the video camera 10 is transmitted via the BT communication path.

Operation information of starting or stopping recording processing, for example, is transmitted to the video camera 10 via the Wi-Fi communication path.

Also other operation information is transmitted to the video camera 10 via the communication path determined depending on the operation type.

Note that in the case where only any one of the Wi-Fi communication path and the BT communication path is blocked, the operation information is transmitted via the other communication path that is being connected.

Next, the communication configuration in the case where the mode of the remote control 20 is set to the following two modes; (b2) recorded image non-display normal mode and (b3) recorded image non-display stamina mode shown in the center portion of FIG. 9 will be described.

In the case where the mode of the remote control 20 is set to any one of these two modes, as shown in FIG. 9, the status information is transmitted from the video camera 10 to the remote control 20 through Wi-Fi communication, and the operation information of the remote control 20 is transmitted to the video camera 10 by using the Wi-Fi communication and BT communication.

In the "(b2) recorded image non-display normal mode" and "(b3) recorded image non-display stamina mode," an image is not transmitted from the video camera 10 to the remote control 20.

In these two modes, transmission from the video camera 10 to the remote control 20 is stopped, and image display in the remote control 20 is also stopped.

By stopping image transmission processing and image display processing, the battery consumption is reduced to achieve electric power saving.

The status information transmitted from the video camera 10 through the Wi-Fi communication includes, for example, information relating to whether or not recoding is performed, recorded image quality (e.g., HD and SD) information, recording time period information, and battery remaining amount information of the battery attached to the video camera.

The operation information of the remote control 20 is transmitted to the video camera 10 by using Wi-Fi communication and BT communication. Of the Wi-Fi communication path and the BT communication path, a communication path through which the operation information is transmitted is determined depending on the operation type in advance.

For example, power source ON/OFF information of the video camera 10 is transmitted via the BT communication path.

Operation information of starting or stopping recording processing, for example, is transmitted to the video camera 10 via the Wi-Fi communication path.

Also other operation information is transmitted to the video camera 10 via the communication path determined depending on the operation type.

Note that in the case where only any one of the Wi-Fi communication path and the BT communication path is blocked, the operation information is transmitted via the other communication path that is being connected.

Next, the communication configuration in the case where the mode of the remote control 20 is set to the following mode; (b4) recorded image non-display Bluetooth (BT) single communication mode shown in the bottom portion of FIG. 9 will be described.

In the case where the mode of the remote control 20 is set to this mode, as shown in FIG. 9, the status information is transmitted from the video camera 10 not through Wi-Fi communication but through BT communication, and the operation information of the remote control 20 is transmitted to the video camera 10 through only the BT communication.

That is, in the "(b4) recorded image non-display Bluetooth (BT) single communication mode", an image is not transmitted from the video camera 10 to the remote control 20, the Wi-Fi connection between the video camera 10 and the remote control 20 is cut off, and data transfer via the Wi-Fi communication path is all stopped.

The communication between the video camera 10 and the remote control 20 such as transmission of the status information from the video camera 10 to the remote control 20 and transmission of the operation information from the remote control 20 to the video camera 10 is performed only via the BT communication path.

As described above with reference to FIG. 8, the BT communication has power consumption lower than that of the Wi-Fi communication.

Therefore, in the "(b4) recorded image non-display Bluetooth (BT) single communication mode," it is possible to achieve electric power saving by using only the BT communication.

In this embodiment, the BT communication is any one of the existing BT communication and BTLE (or BLE) communication described with reference to FIG. 8.

The status information transmitted from the video camera 10 through the BT communication includes, for example, information relating to whether or not recoding is performed, recorded image quality (e.g., HD and SD) information, recording time period information, and battery remaining amount information of the battery attached to the video camera.

The operation information of the remote control 20 is transmitted only via the BT communication path.

For example, power source ON/OFF information of the video camera 10, operation information of starting or stopping recording processing, and other operation information are all transmitted to the video camera 10 via the BT communication path.

4. Regarding State Transition and Mode Transition in Remote Control

Next, the state transition and mode transition in the remote control 20 will be described with reference to FIG. 10.

As described above with reference to FIG. 9, the state set in the remote control 20 includes the following three states: (X) power source off state; (A) recording preparing state; and (B) recording performing state.

Further, the mode of the remote control 20 is set to the (a1) recording preparing image display mode in the (A) recording preparing state.

The mode of the remote control 20 is set to any one of four modes of (b1) recorded image display normal mode, (b2) recorded image non-display normal mode, (b3) recorded image non-display stamina mode, and (b4) recorded image non-display Bluetooth (BT) single communication mode in the (B) recording performing state.

The remote control 20 performs transition between the plurality of states or modes in accordance with a user's operation or under predetermined transition conditions.

The transition processing is performed under the control of the control unit of the remote control 20.

The control unit of the remote control 20 performs control to change the apparatus mode in response to, for example, the input of operation information to the operation unit of the remote control 20 or depending on time period in which operation information is not input thereto.

Further, the control unit performs processing to change the communication mode via the communication unit in response to the change of the apparatus mode.

Figure 10:
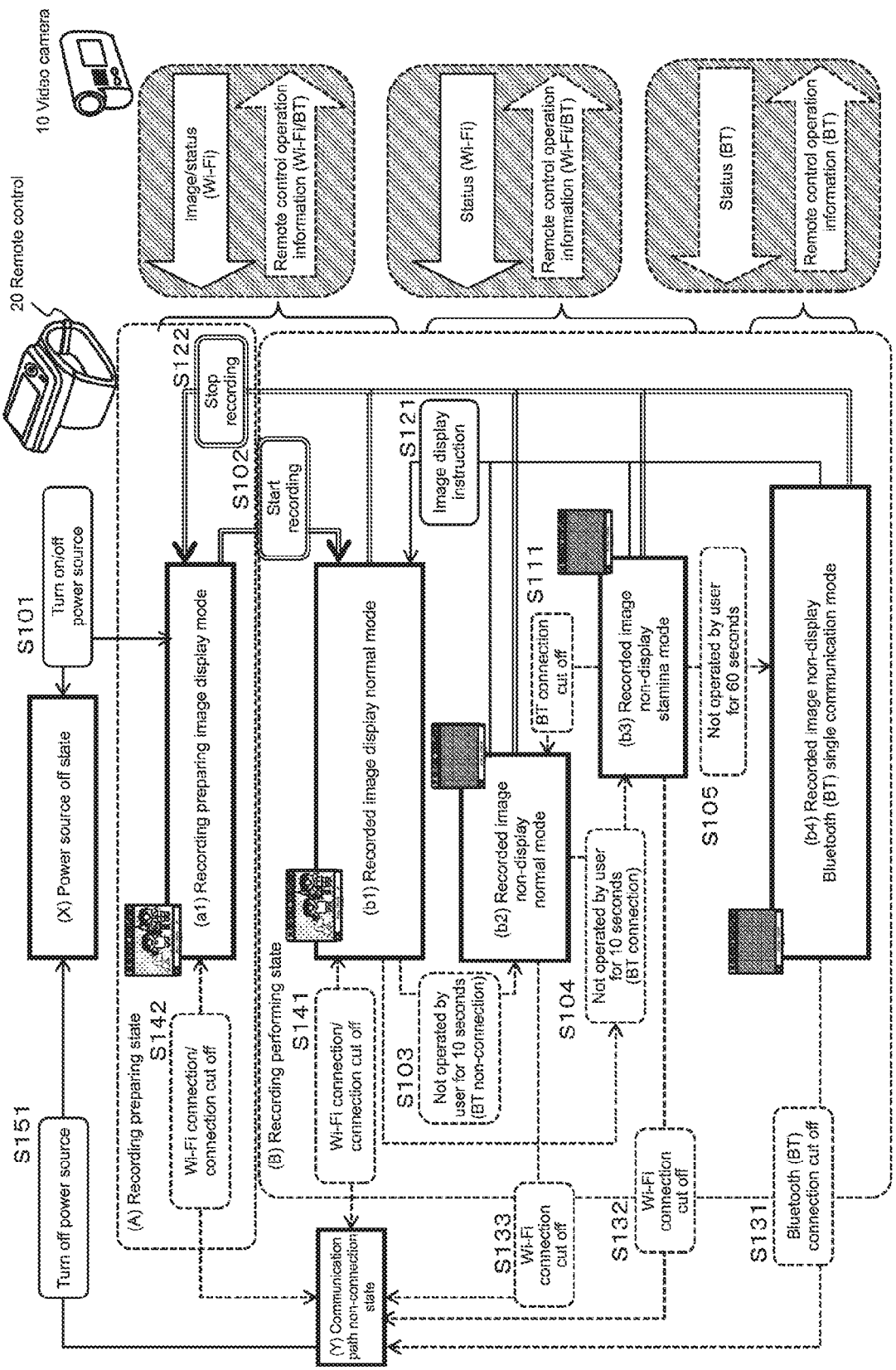
FIG. 10 is a diagram explaining a state transition and a mode transition of the remote control.

FIG. 10 is a diagram explaining the state transition and mode transition of the remote control 20.

In FIG. 10, the steps of state transition and mode transition are shown as Step S101 to Step S151.

Hereinafter, the processing in each step will be sequentially described.

(Step S101)

Step S101 represents state transition between the (X) power source off state and the (a1) recording preparing image display mode in the (A) recording preparing state.

This state transition is performed by turning on/off the switch of the power source of the remote control 20 by the user.

In the case where the user turns on the switch of the power source of the remote control 20 in the (X) power source off state, the mode of the remote control 20 makes a transition to the (a1) recording preparing image display mode in the (A) recording preparing state.

During the state transition processing, the following processing: (1) processing to establish Wi-Fi connection and BT connection between the remote control 20 and the video camera 10; (2) processing to start transmission of an image picked up by the video camera 10 to the remote control 20; and (3) processing to start displaying the picked up image on the display unit 21 of the remote control 20, is performed.

The transmission display image at this point is an image on which the recording processing is not being performed.

(Step S102)

Step S102 represents mode transition from the (a1) recording preparing image display mode in the (A) recording preparing state to the (b1) recorded image display normal mode in the (B) recording performing state.

This mode transition is performed by a recording start operation on the remote control 20 performed by the user.

In the case where the user performs the recording start operation on the remote control 20 in the (a1) recording preparing image display mode in the (A) recording preparing state, the mode of the remote control 20 makes a transition to the (b1) recorded image display normal mode in the (B) recording performing state.

During the state transition processing, the following processing: (1) processing to transmit a request for starting recording from the remote control 20 to the video camera 10; (2) processing to start recording performed by the video camera 10; (3) processing to transmit an image picked up by the video camera 10 (=recorded image) to the remote control 20; and (4) processing to display the picked up image (=recorded image) on the display unit 21 of the remote control 20, is performed. The transmission display image at this point is an image on which the recording processing is being performed.

(Step S103)

Step S103 represents mode transition from the (b1) recorded image display normal mode in the (B) recording performing state to the (b2) recorded image non-display normal mode in the (B) recording performing state.

This mode transition is performed in the case where the remote control 20 unoperated by the user for a predetermined time period or more (e.g., 10 seconds) in the (b1) recorded image display normal mode.

This mode transition represents mode transition in the case where BT connection is not established between the remote control 20 and the video camera 10.

For example, this mode transition is performed in the case where the video camera 10 is an old model that has no BT communication function or the BT connection is cut off between the remote control 20 and the video camera 10.

During this mode transition processing, the following processing: (1) processing to transmit the request for stopping transmission of the recorded image from the remote control 20 to the video camera 10; (2) processing to stop transmission of the image picked up by the video camera 10 (=recorded image) to the remote control 20; and (3) processing to stop displaying the picked up image (=recorded image) on the display unit 21 of the remote control 20, is performed.

Note that even if this mode transition is performed, the recording processing performed by the video camera 10 is continued.

By this processing, the transmission of the picked up image from the video camera 10 to the remote control 20 is stopped, and the display of the picked up image on the display unit 21 of the remote control 20 is also stopped.

By this processing, the battery consumption in the video camera 10 and the remote control 20 is reduced to achieve electric power saving.

(Step S104)

Step S104 represents mode transition from the (b1) recorded image display normal mode in the (B) recording performing state to the (b3) recorded image non-display stamina mode in the (B) recording performing state.

This mode transition is performed in the case where the remote control 20 unoperated by the user for a predetermined time period or more (e.g., 10 seconds) in the (b1) recorded image display normal mode.

This mode transition represents mode transition in the case where the BT connection is established between the remote control 20 and the video camera 10.

That is, the mode transition of Step S103 is performed in the case where the BT connection is not established between the remote control 20 and the video camera 10, and the mode transition of Step S104 is performed in the case where the BT connection is established between the remote control 20 and the video camera 10.

Note that in the case where the BT connection between the remote control 20 and the video camera 10 is restored after the processing of Step S103 is performed, and after that, the remote control 20 unoperated by the user for a predetermined time period or more (e.g., 10 seconds), the mode of the remote control 20 makes a transition from the (b2) recorded image non-display normal mode in the (B) recording performing state to the (b3) recorded image non-display stamina mode in the (B) recording performing state.

The processing performed during the mode transition processing from the (b1) recorded image display normal mode in the (B) recording performing state to the (b3) recorded image non-display stamina mode in the (B) recording performing state is the same as that performed during the mode transition of Step S103, and the following processing: (1) processing to transmit the request for stopping transmission of the recorded image from the remote control 20 to the video camera 10; (2) processing to stop transmission of the image picked up by the video camera 10 (=recorded image) to the remote control 20; and (3) processing to stop displaying the picked up image (=recorded image) on the display unit 21 of the remote control 20, is performed.

Note that even if this mode transition is performed, the recording processing performed by the video camera 10 is continued.

By this processing, the transmission of the picked up image from the video camera 10 to the remote control 20 is stopped, and the display of the picked up image on the display unit 21 of the remote control 20 is also stopped.

By this processing, the battery consumption in the video camera 10 and the remote control 20 is reduced to achieve electric power saving.
(Step S105)

Step S105 represents mode transition from the (b3) recorded image non-display stamina mode in the (B) recording performing state to the (b4) recorded image non-display Bluetooth (BT) single communication mode in the (B) recording performing state.

This mode transition is performed in the case where the remote control 20 unoperated by the user for a predetermined time period or more (e.g., 60 seconds) in the (b3) recorded image non-display stamina mode.

This mode transition represents mode transition in the case where the BT connection is established between the remote control 20 and the video camera 10.

During this mode transition processing, the following processing: (1) processing to stop Wi-Fi connection between the remote control 20 and the video camera 10; (2) processing to switch, from the Wi-Fi path to the BT path, the path for transmitting the status information from the video camera 10; and (3) processing to switch, to the BT communication path only without using the Wi-Fi communication path, the communication path for the operation information transmitted from the remote control 20 to the video camera 10, is performed.

Note that even if this mode transition is performed, the recording processing performed by the video camera 10 is continued.

By this processing, the Wi-Fi connection between the video camera 10 and the remote control 20 is stopped.

By this processing, the battery consumption in the video camera 10 and the remote control 20 is further reduced to achieve electric power saving.
(Step S121)

Step S121 represents mode transition from any one of the (b2) recorded image non-display normal mode in the (B) recording performing state, the (b3) recorded image non-display stamina mode in the (B) recording performing state, or the (b4) recorded image non-display Bluetooth (BT) single communication mode in the (B) recording performing state to the (b1) recorded image display normal mode in the (B) recording performing state.

This mode transition is performed in the case where the user issues an image display instruction for the remote control 20 in any one of the modes of (b2) to (b4).

Note that almost all input operations performed by the user on the remote control 20 such as a switch operation and a touch operation of the display unit having a function as a touch panel are interpreted as image display instruction input in any one of the modes of (b2) to (b4), and this mode transition of Step S121 is performed.

By this mode transition, the following processing: (1) processing to restore the Wi-Fi connection between the video camera 10 and the remote control 20 in the case where the Wi-Fi connection is stopped; (2) processing to request for transmitting the picked up image (=recorded image) from the remote control 20 to the video camera 10; (3) processing to transmit the image picked up by the video camera 10 (=recorded image) to the remote control 20; and (4) processing to display the picked up image (=recorded image) on the display unit 21 of the remote control 20, is performed.

The transmission display image at this point is an image on which the recording processing is being performed.
(Step S122)

Step S122 represents mode transition from any one of the (b1) recorded image display normal mode in the (B) recording performing state, the (b2) recorded image non-display normal mode in the (B) recording performing state, the (b3) recorded image non-display stamina mode in the (B) recording performing state, and in the (b4) recorded image non-display Bluetooth (BT) single communication mode in the (B) recording performing state to the (a1) recording preparing image display mode in the (A) recording preparing state.

This mode transition is performed in the case where the user performs an input operation to stop recording on the remote control 20 in any one of the modes of (b1) to (b4).

The input operation includes, for example, an operation of a recording stop button.

By this mode transition, the following processing: (1) processing to transmit a request for stopping the recording processing from the remote control 20 to the video camera 10; (2) processing to stop the recording processing performed by the video camera 10; (3) processing to transmit an image picked up by the video camera 10 (≠recorded image) to the remote control 20; and (4) processing to display the picked up image (≠recorded image) on the display unit 21 of the remote control 20, is performed.

The transmission display image after the mode transition is an image on which the recording processing is not being performed.
(Connection Cutting Off in Steps S131 to S133 and S141 and S142)

The mode transition is performed in the case where the Wi-Fi connection or BT connection between the remote control 20 and the video camera 10 is stopped in any one of the (a1) recording preparing image display mode in the (A) recording preparing state and the (b1) recorded image display normal mode, (b2) recorded image non-display normal mode, (b3) recorded image non-display stamina mode, and (b4) recorded image non-display Bluetooth (BT) single communication mode in the (B) recording performing state.

By this mode transition, as shown in FIG. 10, the state of the remote control 20 makes a transition to the (Y) communication path non-connection state.

In the case where this mode transition is performed, the communication performed between the video camera 10 and the remote control 20 is cut off.

Note that the state of recording processing performed by the video camera 10 is not changed. That is, in the case where the recording is being performed, the recording processing is continued.

In the case where this mode transition is performed, the remote control 20 performs processing to restore the communication path between the remote control 20 and the video camera 10.

That is, the remote control 20 performs processing to restore the Wi-Fi connection and BT connection.

In the case where this communication path restoring processing succeeds, the mode transition of "connection of Step S141" or "connection of Step S142" is performed.

(Connection of Step S141)

The mode transition of connection of Step S141 represents mode transition from the (Y) communication path non-connection state to the (b1) recorded image display normal mode.

This mode transition is performed in the case where the mode of the remote control 20 makes a transition from any one of the (b1) recorded image display normal mode, (b2) recorded image non-display normal mode, (b3) recorded image non-display stamina mode, and (b4) recorded image non-display Bluetooth (BT) single communication mode in the (B) recording performing state to the (Y) communication path non-connection state, and after that, the communication path (at least Wi-Fi communication path) between the video camera 10 and the remote control 20 is restored.

In this mode transition, the following processing: (1) processing to restore the Wi-Fi connection in the case where the Wi-Fi communication between the video camera 10 and the remote control 20 is being stopped; (2) processing to request for transmitting a picked up image (=recorded image) from the remote control 20 to the video camera 10; (3) processing to transmit the image picked up by the video camera 10 (=recorded image) to the remote control 20; and (4) processing to display the picked up image (=recorded image) on the display unit 21 of the remote control 20, is performed.

The transmission display image at this point is an image on which the recording processing is being performed.

(Connection of Step S142)

The mode transition of connection of Step S142 represents mode transition from the (Y) communication path non-connection state to the (a1) recording preparing image display mode.

This mode transition is performed in the case where the mode of the remote control 20 makes a transition from the (a1) recording preparing image display mode in the (A) recording preparing state to the (Y) communication path non-connection state, and after that, the communication path (at least Wi-Fi communication path) between the video camera 10 and the remote control 20 is restored.

In this mode, the following processing: (1) processing to restore the Wi-Fi connection in the case where the Wi-Fi communication between the video camera 10 and the remote control 20 is being stopped; (2) processing to request for transmitting a picked up image (≠recorded image) from the remote control 20 to the video camera 10; (3) processing to transmit the image picked up by the video camera 10 (≠recorded image) to the remote control 20; and (4) processing to display the picked up image (≠recorded image) on the display unit 21 of the remote control 20, is performed.

The transmission display image at this point is an image on which the recording processing is not being performed.

(Step S151)

The mode transition of Step S151 represents state transition from the (Y) communication path non-connection state to the (X) power source off state.

This state transition is performed in the case where the user turns off the switch of the power source of the remote control 20 in the (Y) communication path non-connection state.

By this user's operation, the remote control 20 is turned off.

In the case where this state transition is performed, the following processing: (1) processing to stop the restoring processing of the communication path between the video camera 10 and the remote control 20, is performed.

Note that the processing being performed by the video camera 10 is continued even if this state transition is performed. However, in the case where the communication path between the video camera 10 and the remote control 20 is not restored for a predetermined time period or more (e.g., 1 minute) during the recording processing, the recording processing is automatically stopped.

5. Regarding State Transition and Mode Transition in Video Camera

Next, the state transition and mode transition in the video camera 10 will be described with reference to FIG. 11.

The state and mode of the video camera 10 are set to a plurality of states and modes corresponding to the states and modes of the remote control 20.

The processing to set these states or modes, the state transition processing, and the mode transition processing are performed under the control of the control unit of the video camera 10.

The control unit of the video camera 10 performs control to change the apparatus mode in response to, for example, the input of operation information to the operation unit of the remote control 20 or depending on time period in which operation information is not input thereto. Further, the control unit performs processing to change the communication mode via the communication unit in response to the change of the apparatus mode.

Figure 11:
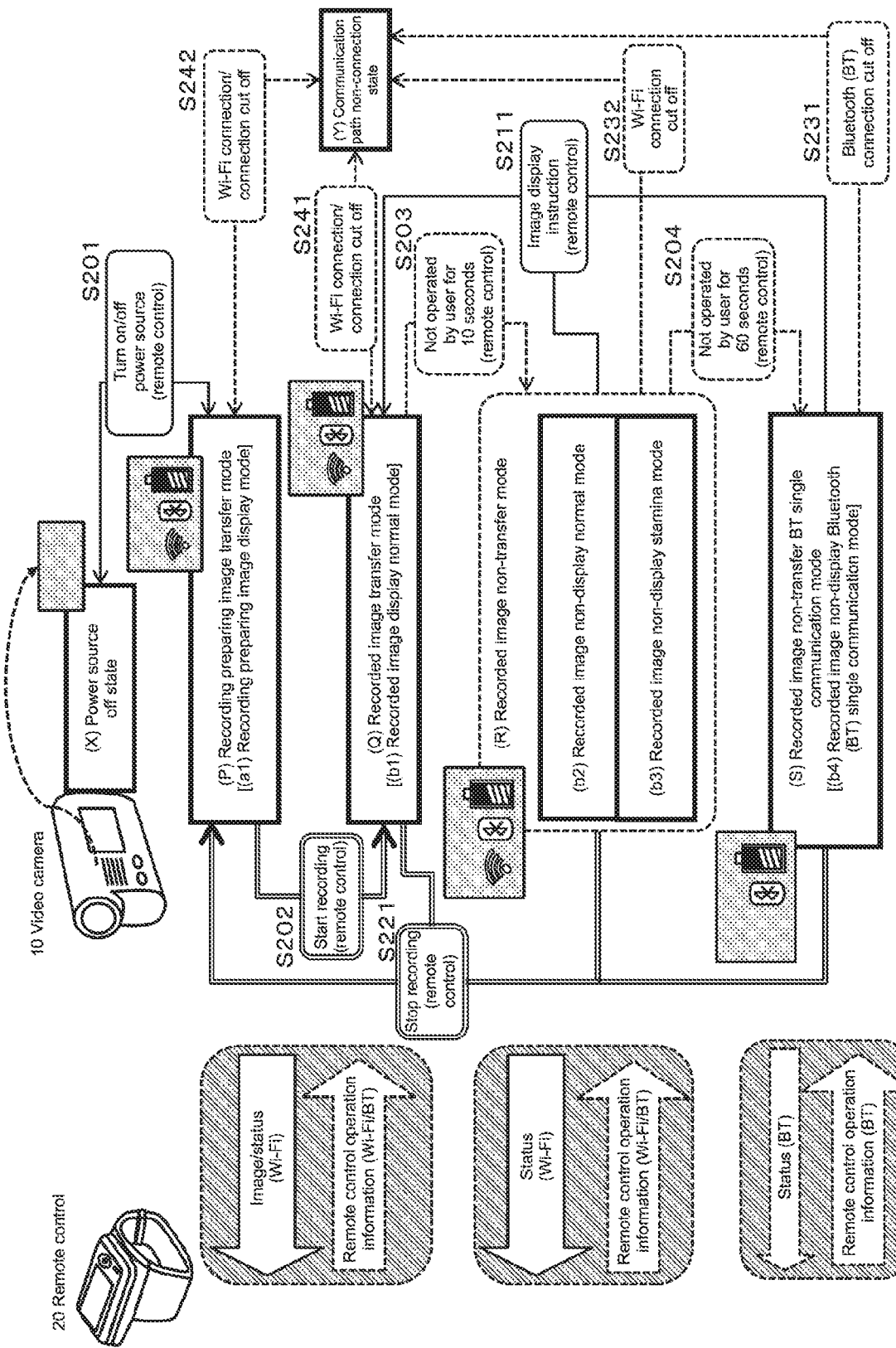
FIG. 11 is a diagram explaining a state transition and a mode transition of the video camera.

As shown in FIG. 11, the state and mode of the video camera 10 are set to the following states and modes: (X) power source off state; (P) recording preparing image transfer mode; (Q) recorded image transfer mode; (R) recorded image non-transfer mode; and (S) recorded image non-transfer BT single communication mode.

The (P) recording preparing image transfer mode of the video camera 10 represents a mode set when the mode of the remote control 20 is being set to the (a1) recording preparing image display mode.

The (Q) recorded image transfer mode of the video camera 10 represents a mode set when the mode of the remote control 20 is being set to the (b1) recorded image display normal mode.

The (R) recorded image non-transfer mode of the video camera 10 represents a mode set when the mode of the remote control 20 is being set to the (b2) recorded image non-display normal mode or the (b3) recorded image non-display stamina mode.

The (S) recorded image non-transfer BT single communication mode of the video camera 10 represents a mode set when the mode of the remote control 20 is being set to the (b4) recorded image non-display Bluetooth (BT) single communication mode.

The state and mode of the video camera 10 make a transition to the (X) power source off state and the (P) recording preparing image transfer mode, (Q) recorded image transfer mode, (R) recorded image non-transfer mode, and (S) recorded image non-transfer BT single communication mode depending on the state and mode of the remote control 20. This transition is performed in accordance with a user's operation on the remote control 20 or under predetermined transition conditions.

FIG. 11 is a diagram explaining the state transition and mode transition.

In FIG. 11, the steps of state transition and mode transition are shown as Step S201 to Step S242.

Hereinafter, the processing in each step will be sequentially described.

(Step S201)

Step S201 represents state transition between the (X) power source off state and the (P) recording preparing image transfer mode.

This state transition is performed by turning on/off the switch of the power source of the video camera in the remote control 20 by the user.

In the case where the user turn on the switch of the power source of the video camera in the remote control 20 in the (X) power source off state, an activation signal for the video camera 10 is transmitted from the remote control 20 to the video camera 10 via the BT communication path, for example.

The mode of the video camera 10 makes a transition to the (P) recording preparing image transfer mode in response to the activation signal.

Note that the mode of the video camera 10 is set to the standby mode in which the video camera 10 is capable of receiving a signal from the remote control even if the power source is turned off.

During the state transition processing of Step S201, the following processing: (1) processing to establish Wi-Fi connection and BT connection between the remote control 20 and the video camera 10; (2) processing to start transmission of an image picked up by the video camera 10 to the remote control 20; and (3) processing to start display of the picked up image on the display unit 21 of the remote control 20, is performed.

The transmission display image at this point is an image on which the recording processing is not being performed.

(Step S202)

Step S202 represents mode transition from the (P) recording preparing image transfer mode to the (Q) recorded image transfer mode.

This mode transition in the video camera 10 is performed corresponding to the mode transition of Step S102 in the remote control 20, i.e., mode transition from the (a1) recording preparing image display mode in the (A) recording preparing state to the (b1) recorded image display normal mode in the (B) recording performing state.

This mode transition is performed in response to the recording start operation on the remote control 20 performed by the user.

In the case where the user performs the recording start operation on the remote control 20 when the mode of the video camera 10 is the (P) recording preparing image transfer mode and the mode of the remote control 20 is the (a1) recording preparing image display mode in the (A) recording preparing state, the mode of the video camera 10 makes a transition to the (Q) recorded image transfer mode.

The mode of the remote control 20 makes a transition to the (b1) recorded image display normal mode in the (B) recording performing state.

During this state transition processing, the following processing: (1) processing to transmit a request for starting recording from the remote control 20 to the video camera 10; (2) processing to start recording performed by the video camera 10; (3) processing to transmit an image picked up by the video camera 10 (=recorded image) to the remote control 20; and (4) processing to display the picked up image (=recorded image) on the display unit 21 of the remote control 20, is performed. The transmission display image at this point is an image on which the recording processing is being performed.

(Step S203)

Step S203 represents mode transition from the (Q) recorded image transfer mode to the (R) recorded image non-transfer mode.

This mode transition in the video camera 10 is performed corresponding to the mode transition of Step S103 or Step S104 in the remote control 20, i.e., mode transition from the (b1) recorded image display normal mode in the (B) recording performing state to the (b2) recorded image non-display normal mode in the (B) recording performing state or mode transition from the (b1) recorded image display normal mode in the (B) recording performing state to the (b3) recorded image non-display stamina mode in the (B) recording performing state.

This mode transition is performed in the case where the remote control 20 is not performed by the user for a predetermined time period or more (e.g., 10 seconds) when the mode of the video camera 10 is the (Q) recorded image transfer mode and the mode of the remote control 20 is the (b1) recorded image display normal mode.

During this state transition processing, the following processing: (1) processing to transmit a request for stopping transmission of the recorded image from the remote control 20 to the video camera 10; (2) processing to stop the transmission of an image picked up by the video camera 10 (=recorded image) to the remote control 20; and (3) proceeding to stop display of the picked up image (=recorded image) on the display unit 21 of the remote control 20, is performed.

Even if this mode transition is performed, the recording processing performed by the video camera 10 is continued.

By this processing, transmission of the picked up image from the video camera 10 to the remote control 20 is stopped, and display of the picked up image on the display unit 21 of the remote control 20 is also stopped.

By this processing, the battery consumption in the video camera 10 and the remote control 20 is reduced to achieve electric power saving.

(Step S204)

Step S204 represents mode transition from the (R) recorded image non-transfer mode to the (S) recorded image non-transfer BT single communication mode.

This mode transition in the video camera 10 is performed corresponding to the mode transition of Step S105 in the remote control 20, i.e., mode transition from the (b3) recorded image non-display stamina mode in the (B) recording performing state to the (b4) recorded image non-display Bluetooth (BT) single communication mode in the (B) recording performing state.

This mode transition is performed in the case where the remote control 20 unoperated by the user for a predetermined time period or more (e.g., 60 seconds) when the mode of the video camera 10 is the (R) recorded image non-transfer mode and the mode of the remote control 20 is the (b3) recorded image non-display stamina mode.

During this mode transition processing, the following processing: processing to (1) processing to stop Wi-Fi connection between the remote control 20 and the video camera 10; (2) processing to switch, from the Wi-Fi path to the BT path, the path for transmitting the status information from the video camera 10; and (3) processing to switch, to the BT communication path only without using the Wi-Fi communication path, the communication path for the operation information transmitted from the remote control 20 to the video camera 10, is performed.

Note that even if this mode transition is performed, the recording processing performed by the video camera 10 is continued.

By this processing, the Wi-Fi connection between the video camera 10 and the remote control 20 is stopped.

By this processing, the battery consumption in the video camera 10 and the remote control 20 is further reduced to achieve electric power saving.

(Step S211)

Step S211 represents mode transition from any one of the (R) recorded image non-transfer mode and the (S) recorded image non-transfer BT single communication mode to the (Q) recorded image transfer mode.

This mode transition is performed corresponding to the mode transition of Step S121 in the remote control 20. That is, this mode transition is performed corresponding to the mode transition from any one of the (b2) recorded image non-display normal mode in the (B) recording performing state, the (b3) recorded image non-display stamina mode in the (B) recording performing state, and the (b4) recorded image non-display Bluetooth (BT) single communication mode in the (B) recording performing state to the (b1) recorded image display normal mode in the (B) recording performing state.

In the case where the above-mentioned mode transition is performed in the remote control 20, the video camera 10 performs the mode transition from any one of the (R) recorded image non-transfer mode and the (S) recorded image non-transfer BT single communication mode to the (Q) recorded image transfer mode.

By this mode transition, the following processing: (1) processing to restore the Wi-Fi connection between the video camera 10 and the remote control 20 in the case where the Wi-Fi connection is stopped; (2) processing to request for transmitting the picked up image (=recorded image) from the remote control 20 to the video camera 10; (3) processing to transmit the image picked up by the video camera 10 (=recorded image) to the remote control 20; and (4) processing to display the picked up image (=recorded image) on the display unit 21 of the remote control 20, is performed.

The transmission display image at this point is an image on which the recording processing is being performed.

(Step S221)

Step S221 represents mode transition from any one of the (Q) recorded image transfer mode, the (R) recorded image non-transfer mode, and the (S) recorded image non-transfer BT single communication mode to the (P) recording preparing image transfer mode.

This mode transition is performed corresponding to the mode transition of Step S122 in the remote control 20. That is, the video camera 10 performs mode transition from any one of the (Q) recorded image transfer mode, the (R) recorded image non-transfer mode, and the (S) recorded image non-transfer BT single communication mode to the (P) recording preparing image transfer mode, corresponding to the mode transition from any one of the (b1) recorded image display normal mode in the (B) recording performing state, the (b2) recorded image non-display normal mode in the (B) recording performing state, the (b3) recorded image non-display stamina mode in the (B) recording performing state, and the (b4) recorded image non-display Bluetooth (BT) single communication mode in the (B) recording performing state to the (a1) recording preparing image display mode in the (A) recording preparing state.

This mode transition is performed in the case where the user performs an input operation to stop recording on the remote control 20.

The input operation includes, for example, an operation of a recording stop button.

By this mode transition, the following processing: (1) processing to transmit a request for stopping recording from the remote control 20 to the video camera 10; (2) processing to stop the recording performed by the video camera 10; (3) processing to transmit the image picked up by the video camera 10 (recorded image) to the remote control 20; and (4) processing to display the picked up image (≠recorded image) on the display unit 21 of the remote control 20, is performed.

The transmission display image after this mode transition is an image on which the recording processing is not being performed.

(Connection Cutting Off of Steps S231, S232, S241, and S242)

The mode transition is performed in the case where the Wi-Fi connection or BT connection between the remote control 20 and the video camera 10 is stopped in any one of the (P) recording preparing image transfer mode, the (Q) recorded image transfer mode, the (R) recorded image non-transfer mode, and the (S) recorded image non-transfer BT single communication mode.

By this mode transition, the mode of the video camera 10 makes a transition to the (Y) communication path non-connection state as shown in FIG. 11.

This mode transition is performed corresponding to the mode transition performed during connection cutting off of any one of Steps S131 to S133, S141, and S142 in the remote control 20.

This mode transition is performed in the case where the Wi-Fi connection or BT connection between the remote control 20 and the video camera 10 is stopped in any one of the (a1) recording preparing image display mode in the (A) recording preparing state and the (b1) recorded image display normal modem, (b2) recorded image non-display normal mode, (b3) recorded image non-display stamina mode, and (b4) recorded image non-display Bluetooth (BT) single communication mode in the (B) recording performing state.

In the case where this mode transition is performed, the communication between the video camera 10 and the remote control 20 is cut off.

It should be noted that the state of recording processing performed by the video camera 10 is not changed. That is, in the case where the recording is being performed, the recording processing is continued.

In the case where this mode transition is performed, the remote control 20 performs processing to restore the communication path between the remote control 20 and the video camera 10.

That is, the remote control 20 performs processing to restore the Wi-Fi connection and BT connection.

In the case where this communication path restoring processing succeeds, the mode transition of "connection of Step S241" or "connection of Step S242" is performed.
(Connection of Step S241)

The mode transition of connection of Step S241 represents mode transition from the (Y) communication path non-connection state to the (Q) recorded image transfer mode.

This mode transition is performed corresponding to the mode transition of Step S141 in the remote control 20, i.e., mode transition from the (Y) communication path non-connection state to the (b1) recorded image display normal mode.

This mode transition is performed in the case where the mode of the video camera 10 makes a transition from the (Q) recorded image transfer mode to the (Y) communication path non-connection state and after that, the communication path (at least Wi-Fi communication path) between the video camera 10 and the remote control 20 is restored.

In this mode transition, the following processing: (1) processing to restore the Wi-Fi connection between the video camera 10 and the remote control 20 in the case where the Wi-Fi connection is stopped; (2) processing to request for transmitting the picked up image (=recorded image) from the remote control 20 to the video camera 10; (3) processing to transmit the image picked up by the video camera 10 (=recorded image) to the remote control 20; and (4) processing to display the picked up image (=recorded image) on the display unit 21 of the remote control 20, is performed.

The transmission display image at this point is an image on which the recording processing is being performed.
(Connection of Step S242)

The mode transition of connection of Step S242 represents mode transition from the (Y) communication path non-connection state to the (P) recording preparing image transfer mode.

This mode transition is performed corresponding to the mode transition of Step S142 in the remote control 20, i.e., mode transition from the (Y) communication path non-connection state to the (a1) recording preparing image display mode.

This mode transition is performed in the case where the mode of the video camera 10 makes a transition from the (P) recording preparing image transfer mode to the (Y) communication path non-connection state and after that, the communication path (at least Wi-Fi communication path) between the video camera 10 and the remote control 20 is restored.

In this mode transition, the following processing: (1) processing to restore the Wi-Fi connection between the video camera 10 and the remote control 20 in the case where the Wi-Fi connection is stopped; (2) processing to request for transmitting the picked up image (≠recorded image) from the remote control 20 to the video camera 10; (3) processing to transmit the image picked up by the video camera 10 (≠recorded image) to the remote control 20; and (4) processing to display the picked up image (≠recorded image) on the display unit 21 of the remote control 20, is performed.

The transmission display image at this point is an image on which the recording processing is not being performed.

6. Regarding Transition Sequence of Display Data Shown on Display Unit of Remote Control Next, the transition sequence of display data shown on the display unit 21 of the remote control 20 will be described.

Figure 12:
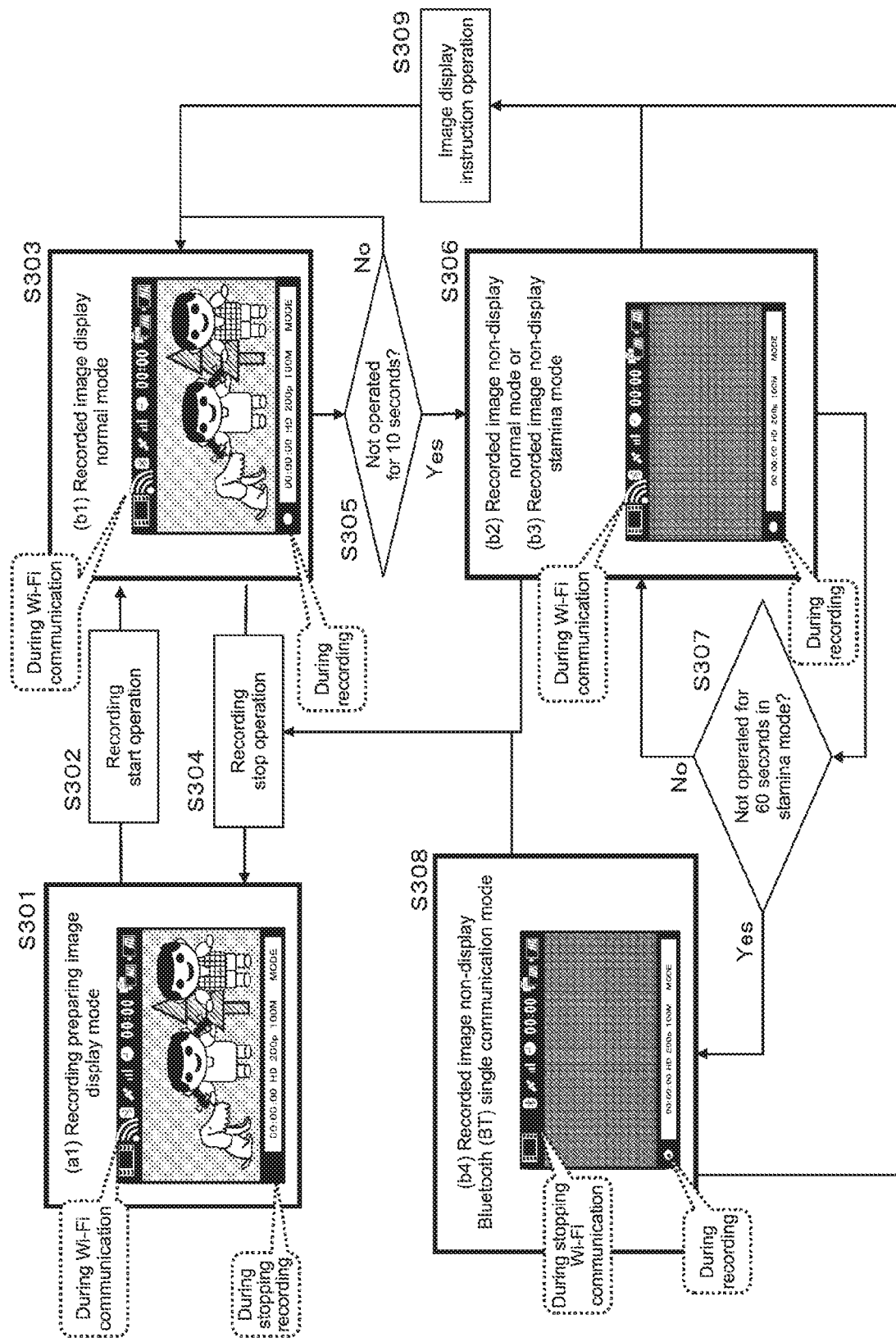
FIG. 12 is a diagram explaining a transition sequence of the display data shown on the display unit of the remote control depending on the state transition and mode transition of the remote control.

FIG. 12 is a diagram explaining the transition sequence of display data shown on the display unit 21 of the remote control 20.

Steps shown in FIG. 12 will be sequentially described.
(Step S301)

The display image of Step S301 is an example of the display image in the case where the mode of the remote control 20 is set to the (a1) recording preparing image display mode in the (A) recording preparing state.

On the display unit 21 of the remote control 20, the picked up image transmitted from the video camera 10 (≠recorded image) is displayed, and icons representing the Wi-Fi connection state and BT communication state are displayed at the upper portion.

The recording performing/stopping lamp at the lower portion is turned off, and thus, the user can recognize that the recording processing is not being performed.
(Steps S302 and S303)

Step S302 represents the operation of the remote control 20 performed by the user. In Step S302, the recording start operation is performed on the operation unit of the remote control 20.

When this operation is performed, the following processing: (1) processing to transmit a request for starting recording from the remote control 20 to the video camera 10; (2) processing to start recording performed by the video camera 10; (3) processing to transmit an image picked up by the video camera 10 (=recorded image) to the remote control 20; and (4) processing to display the picked up image (=recorded image) on the display unit 21 of the remote control 20, is performed.

By the user's operation of Step S302, the mode of the remote control 20 makes a transition to the (b1) recorded image display normal mode in the (B) recording performing state as shown in Step S303, and the image transmitted from the video camera 10 is displayed on the display unit 21.

The transmission display image at this point is an image on which the recording processing is being performed.

As shown in Step S303 of FIG. 12, the picked up image transmitted from the video camera 10 (=recorded image) is displayed on the display unit 21 of the remote control 20, and icons representing the Wi-Fi connection state and BT communication state are displayed at the upper portion.

The recording performing/stopping lamp at the lower portion is turned on, and thus, the user can recognize that the recording processing is being performed.
(Step S304)

Step S304 represents the operation of the remote control 20 performed by the user. In Step S304, the recording stop operation is performed on the operation unit of the remote control 20.

When this operation is performed, the following processing: (1) processing to transmit a request for stopping recording from the remote control 20 to the video camera 10; (2) processing to stop recording performed by the video camera 10; (3) processing to transmit an image picked up by the video camera 10 (≠recorded image) to the remote control 20; and (4) processing to display the picked up image (≠recorded image) on the display unit 21 of the remote control 20, is performed.

By the user's operation of Step S304, the mode of the remote control 20 makes a transition to the (a1) recording preparing image display mode in the (A) recording preparing state as shown in Step S301, and the image transmitted from the video camera 10 is displayed on the display unit 21.

The transmission display image at this point is an image on which the recording processing is not being performed.

(Step S305)

The control unit of the remote control 20 measures the time period in which the remote control 20 unoperated by the user during the recording processing, i.e., in the (b1) recorded image display normal mode in the (B) recording performing state in Step S303.

In the case where the remote control 20 unoperated for a predetermined time period or more (e.g., 10 seconds), the determination of Step S305 is Yes, and the processing proceeds to Step S306.

Otherwise, the mode of Step S303, i.e., the (b1) recorded image display normal mode in the (B) recording performing state is continued.

(Step S306)

In the case where the remote control 20 unoperated by the user for a predetermined time period or more (e.g., 10 seconds) in Step S305, the determination of Step S305 is Yes, and the processing proceeds to Step S306.

That is, the mode of the remote control 20 makes a transition to the (b2) recorded image non-display normal mode in the (B) recording performing state or the (b3) recorded image non-display stamina mode in the (B) recording performing state.

In the case where the BT communication between the remote control 20 and the video camera 10 is established, the mode of the remote control 20 makes a transition to the (b3) recorded image non-display stamina mode. In the case where the BT communication between the remote control 20 and the video camera 10 is not established, the mode of the remote control 20 makes a transition to the (b2) recorded image non-display normal mode.

In any of the modes, the display data shown on the display unit 21 of the remote control 20 is similar data.

During this mode transition processing, the following processing: (1) processing to transmit a request for stopping transmission of the recorded image from the remote control 20 to the video camera 10; (2) processing to stop transmission of an image picked up by the video camera 10 (=recorded image) to the remote control 20; and (3) processing to stop display of the picked up image (=recorded image) on the display unit 21 of the remote control 20, is performed.

Even if this mode transition is performed, the recording processing performed by the video camera 10 is continued.

As shown in Step S306 of FIG. 12, the display data shown on the display unit 21 of the remote control 20 in the mode of Step S306, i.e., any one of the (b2) recorded image non-display normal mode in the (B) recording performing state and the (b3) recorded image non-display stamina mode in the (B) recording performing state does not include an image picked up by the video camera 10 (=recorded image).

It should be noted that the communication state information at the upper portion of the display unit or the recording performing/stopping information at the lower portion represents that recording is being performed, and also the recording mode information is continued to be displayed.

The user can recognize that the recording processing is being performed, on the basis of these pieces of information.

As shown in Step S306, by stopping the transmission and display of an image, the battery consumption in the remote control 20 and the video camera 10 is reduced to achieve electric power saving.

(Step S307)

The control unit of the remote control 20 measures the time period in which the remote control 20 unoperated by the user during the recording processing, i.e., in the (b2) recorded image non-display normal mode or the (b3) recorded image non-display stamina mode in the (B) recording performing state in Step S306.

In the case where the remote control 20 unoperated by the user for a predetermined time period or more (e.g., 60 seconds) in Step S307, the determination of Step S307 is Yes, and the processing proceeds to Step S308.

Otherwise, the mode of Step S307, i.e., (b2) recorded image non-display normal mode or (b3) recorded image non-display stamina mode in the (B) recording performing state is continued.

(Step S308)

In the case where the remote control 20 unoperated by the user for a predetermined time period or more (e.g., 60 seconds) in Step S307, the determination of Step S307 is Yes, and the processing proceeds to Step S308.

That is, the mode of the remote control 20 makes a transition to the (b4) recorded image non-display Bluetooth (BT) single communication mode in the (B) recording performing state.

During this mode transition processing, the following processing: (1) processing to stop Wi-Fi connection between the remote control 20 and the video camera 10; (2) processing to switch, from the Wi-Fi path to the BT path, the path for transmitting the status information from the video camera 10; and (3) processing to switch, to the BT communication path only without using the Wi-Fi communication path, the communication path for the operation information transmitted from the remote control 20 to the video camera 10, is performed.

Note that even if this mode transition is performed, the recording processing performed by the video camera 10 is continued.

As shown in Step S308 of FIG. 12, the display data shown on the display unit 21 of the remote control 20 in the mode of Step S308, i.e., the (b4) recorded image non-display Bluetooth (BT) single communication mode in the (B) recording performing state does not include an image picked up by the video camera 10 (=recorded image).

It should be noted that the communication state information at the upper portion of the display unit or the recording performing/stopping information at the lower portion represents that recording is being performed, and also the recording mode information is continued to be displayed.

In this mode, the Wi-Fi communication between the remote control 20 and the video camera 10 is stopped. Therefore, the Wi-Fi icon representing that the Wi-Fi communication is valid is turned off.

The user can recognize that the recording processing is being performed and the Wi-Fi communication is stopped, on the basis of these pieces of information.

As shown in Step S308, by stopping the transmission and display of an image and stopping the Wi-Fi communication between the remote control 20 and the video camera 10, the battery consumption in the remote control 20 and the video camera 10 is further reduced to achieve electric power saving.

(Step S309)

The processing of Step S309 represents that the user operates the remote control 20 to request for displaying an image in the state of S306 or S308 in which the recorded image is not displayed.

As described above, in the case where recording processing is being performed and the recorded image is not displayed, almost all input operations performed by the user on the remote control 20 such as a switch operation and a touch operation of the display unit having a function as a touch panel are interpreted as image display instruction input, and this processing of Step S309 is performed.

During the processing of Step S309, the following processing: (1) processing to restore the Wi-Fi connection between the video camera 10 and the remote control 20 in the case where the Wi-Fi connection is stopped; (2) processing to request for transmitting the picked up image (=recorded image) from the remote control 20 to the video camera 10; (3) processing to transmit the image picked up by the video camera 10 (=recorded image) to the remote control 20; and (4) processing to display the picked up image (=recorded image) on the display unit 21 of the remote control 20, is performed.

As a result of the processing, the processing returns to Step S303 and the recorded image is displayed again.

The transmission display image at this point is an image on which the recording processing is being performed.

7. Regarding Another Embodiment

In the above-mentioned embodiment, the video camera 10 and the remote control 20 have been used. However, the configuration of changing a communication mode in accordance with mode transition according to an embodiment of the present disclosure is applicable to other various communication apparatuses.

A configuration example in which processing to change a communication mode in accordance with mode transition according to an embodiment of the present disclosure can be applied will be described with reference to FIG. 13.

Figure 13:
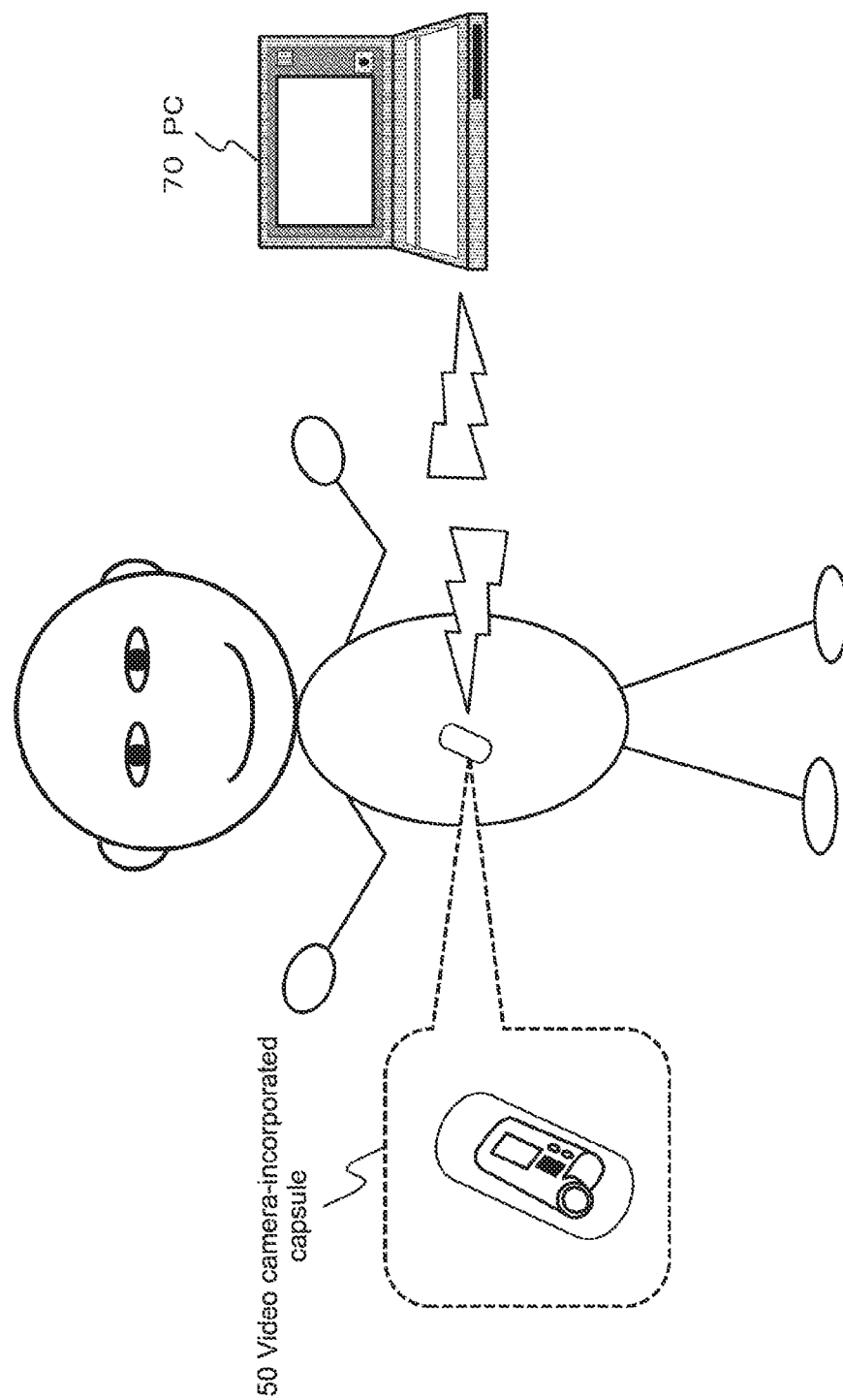
FIG. 13 is a diagram explaining another embodiment to which the configuration of the present disclosure is applied.

FIG. 13 shows a video camera-incorporated capsule 50 and a PC 70. The video camera-incorporated capsule 50 is obtained by incorporating a camera in a capsule. A human can take in the capsule. The camera is capable of pickup an image. The PC 70 communicates with the video camera-incorporated capsule 50.

The PC 70 and the video camera-incorporated capsule 50 perform various kinds of communication processing using the Wi-Fi communication and BT communication together.

Specifically, the following processing: (a) processing to transmit an image picked up by the video camera of the video camera-incorporated capsule 50 to the PC 70 through the Wi-Fi communication; (b) processing to transmit information on the image picked up by the video camera of the video camera-incorporated capsule 50 or status information such as location information to the PC 70 through the Wi-Fi communication or BT communication; and (c) processing to transmit a command (for starting or stopping image pickup, zooming, or flash pickup) from the PC 70 to the video camera of the video camera-incorporated capsule 50 through the Wi-Fi communication or BT communication, is performed.

Between the video camera of the video camera-incorporated capsule 50 and the PC 70, various kinds of data communication are performed.

In such data communication, by changing the communication mode in accordance with the above-described mode transition between the video camera 10 and the remote control 20, it is possible to achieve electric power saving with reduction in battery consumption.

A specific example of mode transition will be described with reference to FIG. 14.

Figure 14:
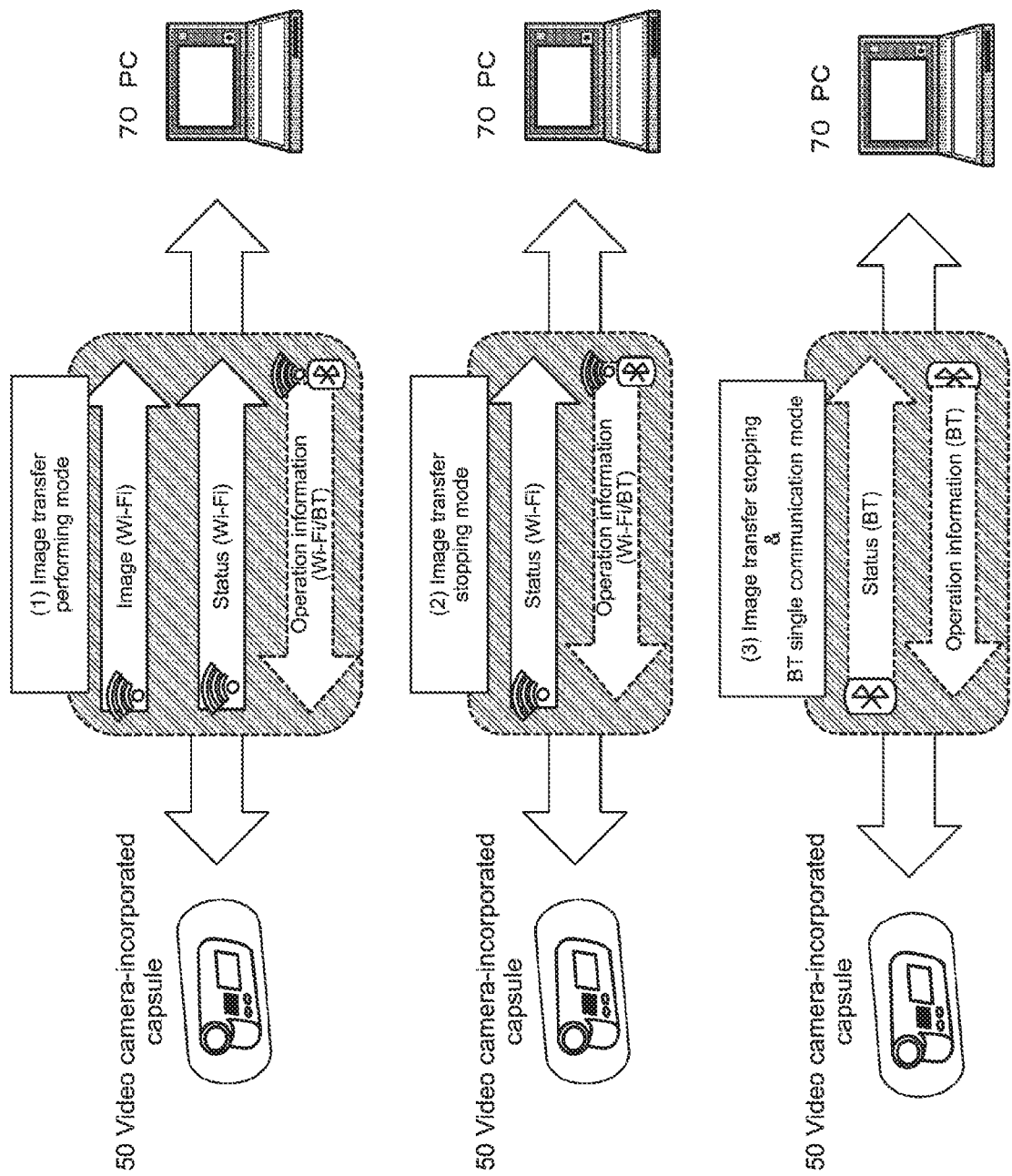
FIG. 14 is a diagram explaining an example in which modes of communication supporting modes in another embodiment to which the configuration of the present disclosure is applied are changed.

FIG. 14 shows the communication data mode supporting three modes between the video camera of the video camera-incorporated capsule 50 and the PC 70.

The three modes are: (1) image transfer performing mode, (2) image transfer stopping mode, and (3) image transfer stopping & BT single communication mode.

The data communication mode between the video camera of the video camera-incorporated capsule 50 in the above-mentioned three modes and the PC 70 is set as follows.

(1) Image Transfer Performing Mode

In this image transfer performing mode, the following data communication: (1a) transmitting an image picked up by the video camera of the video camera-incorporated capsule 50 to the PC 70 through Wi-Fi communication; (1b) transmitting information on the image picked up by the video camera of the video camera-incorporated capsule 50 and status information such as location information to the PC 70 through Wi-Fi communication or BT communication; and (1c) transmitting a command (for starting or stopping image pickup, zooming, or flash pickup) from the PC 70 to the video camera of the video camera-incorporated capsule 50 through the Wi-Fi communication or BT communication, is performed.

In this mode, the image picked up by the video camera of the video camera-incorporated capsule 50 is transmitted to the PC 70 through Wi-Fi communication, and the transmitted image is displayed on the display unit of the PC 70.

(2) Image Transfer Stopping Mode

In this image transfer stopping mode, the following data communication: (2a) transmitting information on the image picked up by the video camera of the video camera-incorporated capsule 50 and status information such as location information to the PC 70 through Wi-Fi communication or BT communication; and (2b) transmitting a command (for starting or stopping image pickup, zooming, or flash pickup) from the PC 70 to the video camera of the video camera-incorporated capsule 50 through the Wi-Fi communication or BT communication, is performed.

In this mode, the processing to transmit the image picked up by the video camera of the video camera-incorporated capsule 50 to the PC 70 through Wi-Fi communication is not performed, and the processing to display the picked up image on the PC 70 is also stopped.

By stopping the image transmission/display processing, the battery consumption in the battery of the video camera of the video camera-incorporated capsule 50 or the battery consumption in the battery of the PC 70 is reduced to achieve electric power saving.

(3) Image Transfer Stopping & BT Single Communication Mode

In this image transfer stopping & BT single communication mode, the following data communication: (3a) transmitting information on the image picked up by the video camera of the video camera-incorporated capsule 50 and status information such as location information to the PC 70 through only BT communication; and (3b) transmitting a command (for starting or stopping image pickup, zooming, or flash pickup) from the PC 70 to the video camera of the video camera-incorporated capsule 50 through only the BT communication, is performed.

In this mode, the processing to transmit the image picked up by the video camera of the video camera-incorporated capsule 50 to the PC 70 through Wi-Fi communication is not performed, and the processing to display the picked up image on the PC 70 is also stopped.

Further, Wi-Fi communication for other data is also stopped.

By stopping the image transmission/display processing and stopping the Wi-Fi communication, the battery consumption in the battery of the video camera of the video camera-incorporated capsule 50 or the battery consumption in the battery of the PC 70 is further reduced to achieve electric power saving.

Other than the configuration described above with reference to FIGS. 13 and 14, by performing processing to change a communication mode in accordance with mode transition according to an embodiment of the present disclosure in various communication systems using Wi-Fi communication and BT communication, it is possible to reduce the battery consumption in each apparatus to achieve electric power saving.

8. Regarding Configuration of Information Processing Apparatus

Next, a hardware configuration example of the respective information processing apparatuses constituting the information processing system according to the embodiment of the present disclosure will be described with reference to FIG. 15 and subsequent figures.

Figure 15:
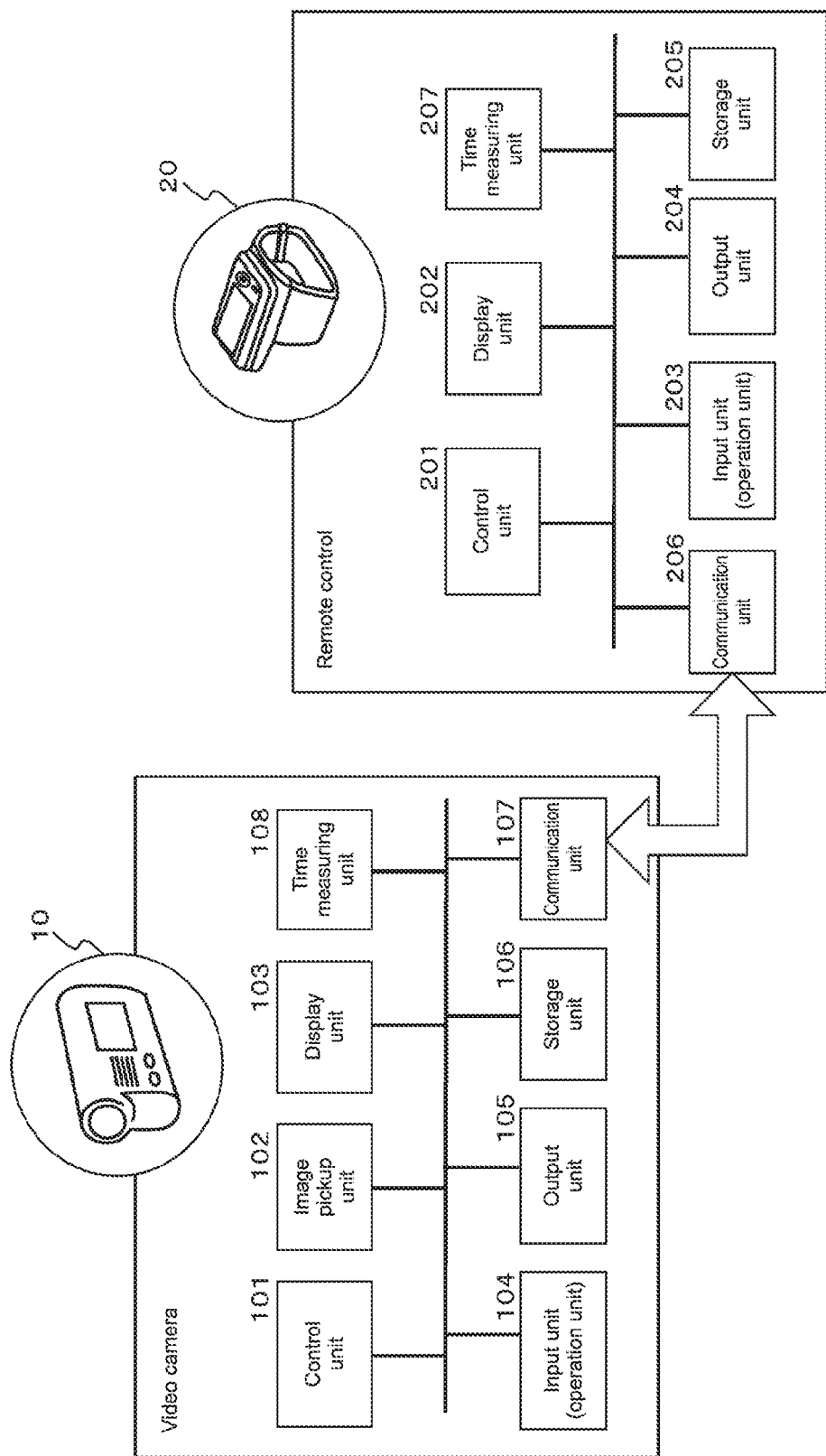
FIG. 15 is a diagram explaining configuration examples of the video camera and the remote control.

FIG. 15 is a block diagram showing a configuration example of the video camera 10 and the remote control 20 shown in FIG. 1.

The video camera 10 includes a control unit 101, an image pickup unit 102, a display unit 103, an input unit (operation unit) 104, an output unit 105, a storage unit 106, a communication unit 107, and a time measuring unit 108.

The control unit 101 controls data processing performed in the video camera 10 such as image pickup control, display control, data transmitting/receiving control, and mode change control. The control unit 101 includes a CPU having a function to execute a program, and performs processing in accordance with the application (program) stored in the storage unit 106, for example.

Specifically, the control unit 101 performs processing in accordance with the above-mentioned sequence, for example.

The image pickup unit 102 is an image pickup unit for image pickup, and picks up a moving image or still image. During the pickup processing, pickup start timing or pickup stop timing is controlled under the control of the control unit 101.

Figure 6:
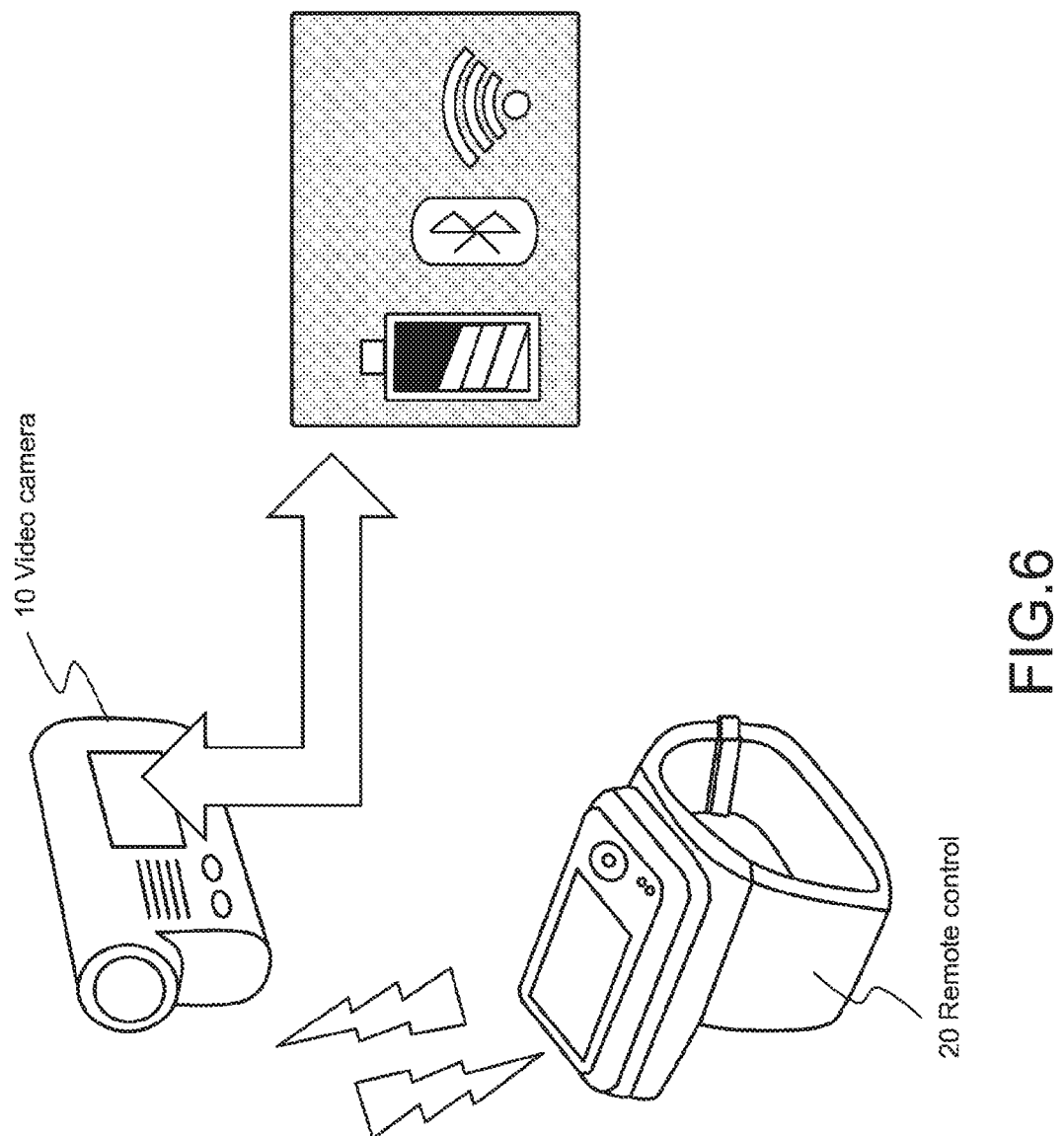
FIG. 6 is a diagram explaining an example of display data shown on a display unit of the video camera.

The display unit 103 is used to display information on the communication state with the remote control 20, battery remaining amount information, and the like, as described above with reference to FIG. 6, for example. Further, it is also possible to use the display unit 103 to perform processing to display the picked up image, read the picked up image from the storage unit 106 to display the image, or the like.

The input unit 104 can be operated by the user, and various operation instructions are issued for the input unit 104, for example. Also a touch panel type display unit is a part of the input unit.

The output unit 105 includes an image output unit, a sound output unit, and a data output unit for the external apparatus. Also the display unit 103 is a component of the output unit 105.

The storage unit 106 includes a RAM, ROM, or another recording medium, for example. The storage unit 106 is used as the storage area for picked up images, and as the storage area for the application program executed by the control unit 101. Further, the storage unit 106 is used as the storage area or work area for parameters applied to data processing performed by the control unit 101, for example.

The communication unit 107 is used to perform processing to communicate with the external apparatus such as the remote control 20, and is used for data communication via various communication paths such as wireless communication including Wi-Fi communication and BT communication and wired communication using, for example, a communication cable.

In the example shown in FIG. 15, a communication path with a communication unit 206 of the remote control 20 is shown.

As in the embodiment described above, various kinds of communication are performed by the communication units of these two apparatuses.

For example, the operation information or the like of the remote control 20 is transmitted to the video camera 10, and the video camera 10 controls starting or stopping of recording, for example. Further, a command for starting or stopping transmission of a picked up image is transmitted from the remote control 20 to the video camera 10, and a picked up image is transmitted from the video camera 10 to the remote control 20.

The time measuring unit 108 has, for example, a clock function representing information on the present time and a timer function for measuring the time period from when the pickup is started. Further, the time measuring unit 108 is used to measure the time period in which operation information is not input from the remote control.

The remote control 20 includes a control unit 201, a display unit 202, an input unit (operation unit) 203, an output unit 204, a storage unit 205, the communication unit 206, and a time measuring unit 207.

The control unit 201 controls data processing performed in the remote control 20 such as image display control, data transmission/reception control, analysis of operation information, and mode change control. The control unit 201 includes a CPU having a function to execute a program, and performs processing in accordance with the application (program) stored in the storage unit 205, for example.

Specifically, the control unit 201 performs processing in accordance with the above-mentioned sequence, for example.

The display unit 202 is used to display the image picked up by the video camera 10, information on the communication state with the video camera 10, battery remaining amount information, and the like, as described above with reference to FIG. 4, for example.

The input unit 203 can be operated by the user, and various operation instructions are issued for the input unit 203, for example. Also a touch panel type display unit is a part of the input unit.

The output unit 204 includes an image output unit, a sound output unit, and a data output unit for the external apparatus. Also the display unit 202 is a component of the output unit 204.

The storage unit 205 includes a RAM, a ROM, or another recording medium, for example. The storage unit 205 is used as the storage area for picked up images, and as the storage area for the application program executed by the control unit 201. Further, the storage unit 205 is used as the storage area or work area for parameters applied to data processing performed by the control unit 201, for example.

The communication unit 206 is used to perform processing to communicate with the external apparatus such as the video camera 10, and is used for data communication via various communication paths such as wireless communication including Wi-Fi communication and BT communication and wired communication using, for example, a communication cable.

In the example shown in FIG. 15, a communication path with the communication unit 107 of the video camera 10 is shown.

As in the embodiment described above, various kinds of communication are performed by the communication units of these two apparatuses.

For example, the operation information or the like of the remote control 20 is transmitted to the video camera 10, and the video camera 10 controls starting or stopping of recording, for example. Further, a command for starting or stopping transmission of a picked up image is transmitted from the remote control 20 to the video camera 10, and a picked up image is transmitted from the video camera 10 to the remote control 20.

The time measuring unit 207 has, for example, a clock function representing information on the present time and a timer function for measuring the time period from when the pickup is started. Further, the time measuring unit 207 is used to measure the time period in which the remote control 20 unoperated by the user, for example.

Figure 16:
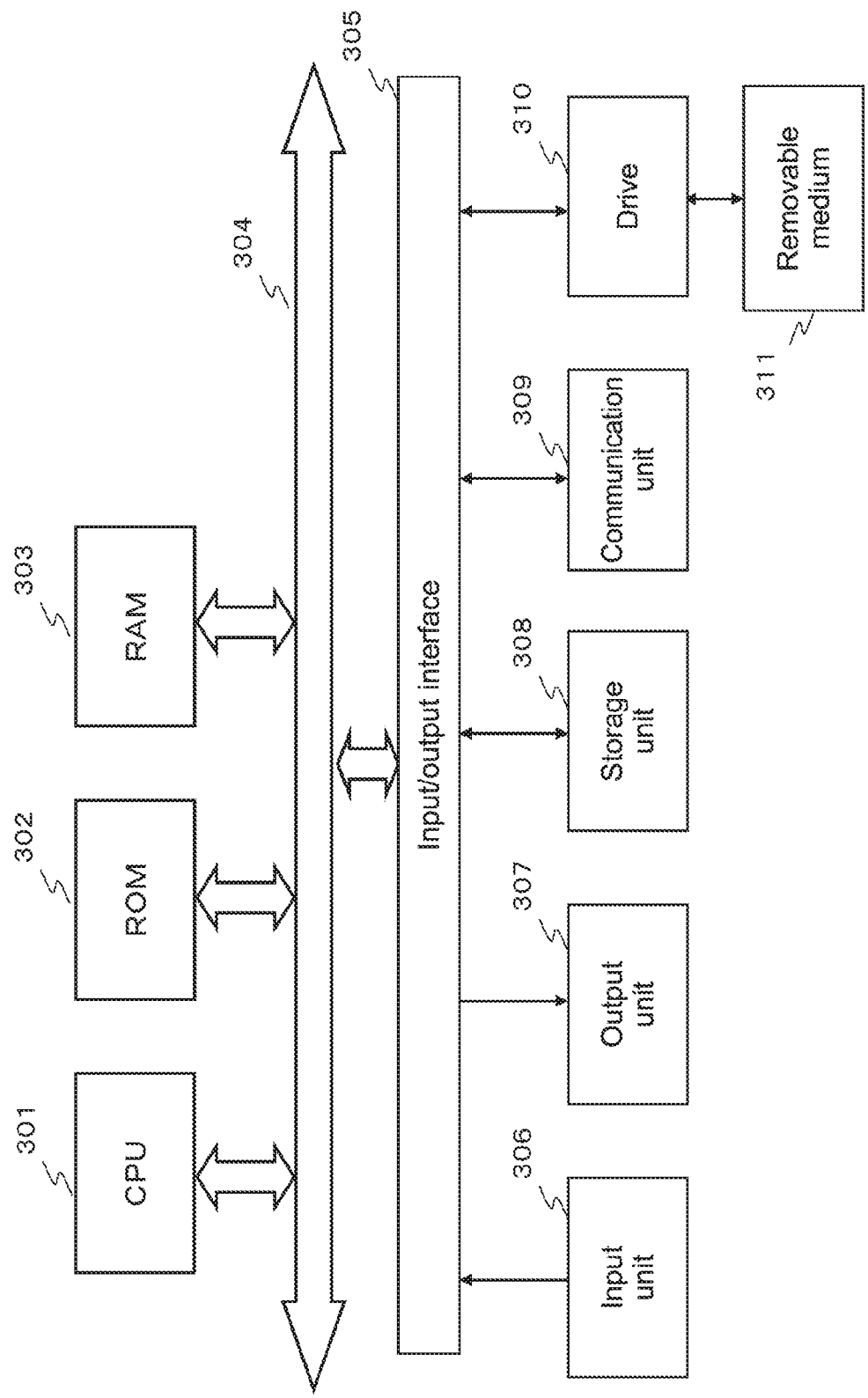
FIG. 16 is a diagram explaining a configuration example of hardware of the remote control or a PC.

FIG. 16 is a diagram showing a hardware configuration example of the information processing apparatus that can be applied to the remote control 20 shown in FIG. 1 or the PC shown in FIG. 13.

A CPU (Central Processing Unit) 301 functions as a control unit or data processing unit that performs various kinds of processing in accordance with a program stored in a ROM (Read Only Memory) 302 or a storage unit 308. For example, the CPU 301 performs processing in accordance with the sequence described in the above-mentioned embodiment. In a RAM (Random Access Memory) 303, a program executed by the CPU 301 or data is stored, for example. The CPU 301, ROM 302, and RAM 303 are connected to each other via a bus 304.

The CPU 301 is connected to an input/output interface 305 via the bus 304. To the input/output interface 305, an input unit 306 including various switches, a keyboard, a mouse, a microphone, and the like, and an output unit 307 including a display, a speaker, and the like are connected. The CPU 301 performs various kinds of processing in response to a command input from the input unit 306, and outputs the processing result to the output unit 307, for example.

A storage unit 308 connected to the input/output interface 305 includes, for example, a hard disk, and stores the program executed by the CPU 301 or various kinds of data. A communication unit 309 functions as a transmission/reception unit for data communication through Wi-Fi communication, BT communication, or a network such as the Internet and a local area network, and communicates with the external apparatus.

A drive 310 connected to the input/output interface 305 drives a removable medium 311 such as a magnetic disk, an optical disc, a magneto-optical disk, and a semiconductor memory including a memory card to store or read data.

9. Summary of Configuration of Present Disclosure

In the above, the embodiment of the present disclosure has been described with reference to a particular embodiment. However, it is obvious that various modifications or substitutions can be made to the embodiment of the present disclosure by a person skilled in the art without departing from the gist of the present disclosure. In other words, the present disclosure has been described hereinabove merely as an example, and hence should not be limitedly construed.

The gist of the present disclosure should be determined with reference to the appended claims.

It should be noted that the present disclosure may also take the following configurations.

(1) An information processing apparatus, including:
a communication unit configured to communicate with an external apparatus via a communication path, the communication path being selected from different communication paths;
an operation unit; and
a control unit configured
to change an apparatus mode depending on an operation state of the operation unit, and
to change, in response to the change of the apparatus mode, a mode of communication performed by the communication unit.

(2) The information processing apparatus according to (1), in which
the control unit stops communication via a first communication path, selects communication only via a second communication path, and communicates with the external apparatus via the second communication path when the operation unit is unoperated for a predetermined time period or more, the communication via the second communication path using less power than power used in the communication via the first communication path.

(3) The information processing apparatus according to (2), in which
the external apparatus is a camera that performs image pickup processing,
the communication unit is configured to receive, via the first communication path, an image picked up by the camera, and
the control unit stops the image reception processing via the first communication path, when the operation unit is unoperated for the predetermined time period or more.

(4) The information processing apparatus according to (3), further including
a display unit that displays the image picked up by the camera, the image being received from the camera via the first communication path, in which
the control unit stops the image reception processing via the first communication path and the image display processing on the display unit, when the operation unit is unoperated for the predetermined time period or more.

(5) The information processing apparatus according to (3) or (4), in which
the control unit performs, in response to input of operation information to the operation unit or depending on a time period in which the operation unit is unoperated, processing to switch between apparatus modes of an image display mode and an image non-display mode, the image reception processing and the image display processing being performed in the image display mode, the image reception processing and the image display processing being stopped in the image non-display mode.

(6) The information processing apparatus according to (5), in which
the control unit performs mode transition to a second communication path single communication mode when the operation unit is unoperated for the predetermined time period or more while the apparatus mode is set to the image non-display mode, the communication with the camera via the first communication path being stopped in the second communication path single communication mode, communication only via the second communication path being selected, communication with the camera via the second communication path being performed in the second communication path single communication mode.

(7) The information processing apparatus according to (6), in which
the control unit performs communication paths switching processing to transmit and receive communication information to/from the camera via the second communication path when the apparatus mode makes a transition to the second communication path single communication mode, the communication information having been transmitted and received to/from the camera via the first communication path.

(8) An image pickup apparatus, including:
an image pickup unit that picks up an image;
a communication unit configured to communicate with a remote control via a communication path, the communication path being selected from different communication paths; and
a control unit configured
to change an apparatus mode depending on an operation state of an operation unit of the remote control, and
to change, in response to the change of the apparatus mode, a mode of communication performed by the communication unit.

(9) The image pickup apparatus according to (8), in which
the control unit stops communication via a first communication path, selects communication only via a second communication path, and communicates with the remote control via the second communication path when the operation unit of the remote control is unoperated for a predetermined time period or more, the communication via the second communication path using less power than power used in the communication via the first communication path.

(10) The image pickup apparatus according to (9), in which
the communication unit is configured to transmit, via the first communication path, an image picked up by the image pickup unit, and
the control unit stops the image transmission processing via the first communication path, when the operation unit of the remote control is unoperated for the predetermined time period or more.

(11) The image pickup apparatus according to (10), in which
the control unit performs, in response to input of operation information to the operation unit of the remote control or depending on a time period in which the operation unit of the remote control unoperated, processing to switch between apparatus modes of an image transfer mode and an image non-transfer mode, the image transmission processing being performed in the image transfer mode, the image transmission processing being stopped in the image non-transfer mode.

(12) The image pickup apparatus according to (11), in which
the control unit performs mode transition to a second communication path single communication mode, when the operation unit of the remote control is unoperated for the predetermined time period or more while the apparatus mode is set to the image non-transfer mode, the communication with the remote control performed via the first communication path being stopped in the second communication path single communication mode, communication only via the second communication path being selected, communication with the remote control via the second communication path being performed in the second communication path single communication mode.

(13) The image pickup apparatus according to (12), in which
the control unit performs communication paths switching processing to transmit and receive communication information to/from the remote control via the second communication path, when the apparatus mode makes a transition to the second communication path single communication mode, the communication information having been transmitted and received to/from the remote control via the first communication path.

(14) An information processing system, including:
an image pickup unit; and
a remote control apparatus that controls the image pickup apparatus, the remote control apparatus including
a communication unit configured to communicate with the image pickup apparatus via a communication path, the communication path being selected from different communication paths,
an operation unit, and
a control unit configured
to change an apparatus mode depending on an operation state of the operation unit, and
to change, in response to the change of the apparatus mode, a mode of communication performed by the communication unit, the image pickup apparatus including
a communication unit configured to communicate with the remote control apparatus via a communication path, the communication path being selected from different communication paths, and
a control unit configured
to change an apparatus mode depending on the operation state of the operation unit of the remote control apparatus, and
to change, in response to the change of the apparatus mode, a mode of communication performed by the communication unit.

(15) The information processing system according to (14), in which
the control unit of the image pickup apparatus and the control unit of the remote control apparatus stop communication via a first communication path, selects communication only via a second communication path, and communicates with each other via the second communication path, when the operation unit of the remote control apparatus is unoperated for a predetermined time period or more, the communication via the second communication path using less power than power used in the communication via the first communication path.

(16) An information processing method, which is executed by an information processing apparatus that includes a communication unit, an operation unit, and a control unit, including:
communicating, by the communication unit, with an external apparatus via a communication path, the communication path being selected from different communication paths;
changing, by the control unit, an apparatus mode depending on an operation state of the operation unit; and
changing, by the control unit in response to the change of the apparatus mode, a mode of communication performed by the communication unit.

(17) An information processing method, which is executed by an image pickup apparatus that includes an image pickup unit, a communication unit, and a control unit, including:
picking up, by the image pickup unit, an image;
communicating, by the communication unit, with a remote control via a communication path, the communication path being selected from different communication paths;

changing, by the control unit, an apparatus mode depending on an operation state of an operation unit of the remote control; and changing, by the control unit, in response to the change of the apparatus mode, a mode of communication performed by the communication unit.

(18) A program that causes an information processing apparatus to execute information processing, the information processing apparatus including, a communication unit configured to communicate with an external apparatus via a communication path, the communication path being selected from different communication paths;

an operation unit; and a control unit configured to change an apparatus mode depending on an operation state of the operation unit, and to change, in response to the change of the apparatus mode, a mode of communication performed by the communication unit.

(19) A program that causes an image pickup apparatus to execute information processing, the image pickup unit including, an image pickup unit configured to pick up an image;

a communication unit configured to communicate with a remote control via a communication path, the communication path being selected from different communication paths; and a control unit configured to change an apparatus mode depending on an operation state of an operation unit of the remote control, and to change, in response to the change of the apparatus mode, a mode of communication performed by the communication unit.

(1B) An information processing apparatus, comprising:
a communication unit configured to communicate with an external apparatus via a communication path, the communication path being selected from a first communication path and a second communication path, the first communication path being different from the second communication path;
an operation unit; and
a control unit configured to change an apparatus mode and to change a mode of communication performed by the communication unit, depending on a state of the operation unit.

(2B) The information processing apparatus according to (1B), wherein the control unit stops communication via the first communication path, selects communication only via the second communication path, and communicates with the external apparatus via the second communication path in response to an absence of input of operation information to the operation unit for a predetermined time period, the communication via the second communication path using less power than power used in the communication via the first communication path.

(3B) The information processing apparatus according to (1B), wherein
the external apparatus is a camera that performs image pickup processing,
the communication unit is configured to receive, via the first communication path, an image picked up by the camera, and
the control unit stops receiving the image via the first communication path in response to an absence of input of operation information to the operation unit for a first predetermined time period.

(4B) The information processing apparatus according to (3B), wherein the control unit stops communication via the first communication path and changes the mode of communication performed by the communication unit in response to the absence of input of operation information to the operation unit for a second predetermined time.

(5B) The information processing apparatus according to (3B), further comprising:
a display unit that displays the image picked up by the camera, wherein
the control unit stops displaying the image on the display unit in response to the absence of input of operation information to the operation unit for the first predetermined time period.

(6B) The information processing apparatus according to (1B), wherein
the control unit performs, in response to an absence of input of operation information to the operation unit for a predetermined time, processing to change the apparatus mode from an image display mode to an image non-display mode.

(7B) The information processing apparatus according to (1B), wherein
the control unit is configured to change the apparatus mode to a second communication path single communication mode in response to an absence of input of operation information to the operation unit for a predetermined time, the communication with the external apparatus via the first communication path being stopped in the second communication path single communication mode.

(8B) The information processing apparatus according to (7B), wherein
the control unit performs communication paths switching processing to transmit and receive communication information to/from the external apparatus via the second communication path when the apparatus mode makes a transition to the second communication path single communication mode, the communication information having previously been transmitted and received to/from the camera via the first communication path.

(9B) The information processing apparatus according to (1B), wherein
the control unit is configured to change the apparatus mode to a second communication path single communication mode in response to an absence of input of operation information to the operation unit for a predetermined time, wherein in the second communication path single communication mode, the external apparatus is prompted to communicate only with the second communication path.

(10B) The information processing apparatus according to (9B), wherein the second communication path uses less power than the first communication path.

(11B) The information processing apparatus according to (1B), wherein the second communication path uses less power than the first communication path.

(12B) The information processing apparatus according to (1B), wherein the first communication path comprises a Wi-Fi communication and the second communication path comprises a Bluetooth communication.

(13B) The information processing apparatus according to (1B), wherein
the apparatus mode is initially associated with a first communication mode wherein both the first communication path and the second communication are available in communications with the external apparatus, and
the control unit is configured to change the apparatus mode in response to an absence of input of operation information to the operation unit for a predetermined time, a second communication mode being associated with the changed apparatus mode, wherein in the second communication mode the first communication path is excluded from usage for at least some communications with the external apparatus.

(14B) An image pickup apparatus, comprising:
an image pickup unit that picks up an image;
a communication unit configured to communicate with a remote control apparatus via a communication path, the communication path being selected from a first communication path and a second communication path, the first communication path being different from the second communication path; and
a control unit configured to change an apparatus mode and to change a mode of communication performed by the communication unit, depending on a state of an operation unit of the remote control apparatus.

(15B) The image pickup apparatus according to (14B), wherein
the control unit stops communication via the first communication path, selects communication only via the second communication path, and
communicates with the remote control apparatus via the second communication path in response to an absence of input of operation information to the operation unit for a predetermined time period, the communication via the second communication path using less power than power used in the communication via the first communication path.

(16B) The image pickup apparatus according to (14B), wherein
the communication unit is configured to transmit, via the first communication path, an image picked up by the image pickup unit, and
the control unit stops the image transmission processing via the first communication path in response to an absence of input of operation information to the operation unit for a first predetermined time period.

(17B) The image pickup apparatus according to (14B), wherein
the control unit performs, in response to an absence of input of operation information to the operation unit for a predetermined time, processing to change the apparatus mode from an image transfer mode to an image non-transfer mode.

(18B) The image pickup apparatus according to (14B), wherein
the control unit is configured to change the apparatus mode to a second communication path single communication mode in response to an absence of input of operation information to the operation unit for a predetermined time, the communication with the remote control apparatus via the first communication path being stopped in the second communication path single communication mode.

(19B) The image pickup apparatus according to (18B), wherein
the control unit performs communication paths switching processing to transmit and receive communication information to/from the remote control apparatus via the second communication path when the apparatus mode makes a transition to the second communication path single communication mode, the communication information having previously been transmitted and received to/from the remote control apparatus via the first communication path.

(20B) An information processing system, comprising:
an image pickup apparatus; and
a remote control apparatus that controls the image pickup apparatus, the remote control apparatus including a communication unit configured to communicate with the image pickup apparatus via a communication path, the communication path being selected from a first communication path and a second communication path, the first communication path being different from the second communication path,
an operation unit, and
a control unit configured to change an apparatus mode and to change a mode of communication performed by the communication unit, depending on a state of the operation unit;
the image pickup apparatus including
an image pickup unit that picks up an image,
a communication unit configured to communicate with the remote control apparatus via the first communication path and the second communication path, and
a control unit configured to change the apparatus mode and to change a mode of communication performed by the communication unit, depending on a state of the operation unit of the remote control apparatus.

(21B) An information processing method, which is executed by an information processing apparatus that includes a communication unit, an operation unit, and a control unit, the method comprising:
communicating, via the communication unit, with an external apparatus via a communication path, the communication path being selected from a first communication path and a second communication path, the first communication path being different from the second communication path; and
changing an apparatus mode and a mode of communication performed by the communication unit, depending on a state of the operation unit.

(22B) A non-transitory computer readable medium storing program code for communications by an information processing apparatus that includes a communication unit, an operation unit, and a control unit, the program code being executable by a processor to perform operations comprising:
communicating, via the communication unit, with an external apparatus via a communication path, the communication path being selected from a first communication path and a second communication path, the first communication path being different from the second communication path; and
changing an apparatus mode and a mode of communication performed by the communication unit, depending on a state of the operation unit.

(23B) An information processing method executable by an image pickup apparatus that includes an image pickup unit, a communication unit and a control unit, the method comprising:
picking up, by the image pickup unit, an image;
communicating, by the communication unit, with a remote control apparatus via a communication path, the communication path being selected from a first communication path and a second communication path, the first communication path being different from the second communication path; and
changing an apparatus mode and a mode of communication performed by the communication unit, depending on a state of an operation unit of the remote control apparatus.

(24B) A non-transitory computer readable medium storing program code for communications by an image pickup apparatus that includes an image pickup unit, a communication unit and a control unit, the program code being executable by a processor to perform operations comprising:
picking up, by the image pickup unit, an image;
communicating, by the communication unit, with a remote control apparatus via a communication path, the communication path being selected from a first communication path and a second communication path, the first communication path being different from the second communication path; and changing an apparatus mode and a mode of communication performed by the communication unit, depending on a state of an operation unit of the remote control apparatus.

A series of processes described in the specification can be executed with hardware, software, or a composite configuration of the hardware and the software. In order that the processes can be executed with the software, programs, which store a sequence of the processes and are installed in a memory in a computer incorporated in dedicated hardware, are executed. Alternatively, the programs to be executed may be installed in a general purpose computer capable of executing various processes. For example, the programs may be recorded in advance in a recording medium, or may be installed from the recording medium to the computer. Alternatively, the programs may be received via networks such as a LAN (Local Area Network) or the Internet, and then installed to recording medium such as a built-in hard disk.

Note that, the various processes described in the specification need not necessarily be executed in time series according to the description, and may be executed in parallel or individually in accordance with processing capabilities of apparatus that execute the processes or as appropriate. Further, the "system" in this specification refers to a logical collective configuration of a plurality of apparatus, and those apparatus having respective configurations are not necessarily provided in the same casing.

As described above, according to the configuration of an embodiment of the present disclosure, it is possible to achieve reduction in power consumption by changing the communication mode depending on the set mode in a communication apparatus that uses a plurality of communication paths together.

Specifically, in an information processing system including an image pickup apparatus and a remote control apparatus that controls the image pickup apparatus, for example, a communication unit of the image pickup apparatus and a communication unit of the remote control apparatus are configured to communicate with each other via communication, the communication path being selected from Wi-Fi communication and Bluetooth (BT: registered trademark) communication, and a control unit of the image pickup apparatus and a control unit of the remote control apparatus stop the Wi-Fi communication and communicate with each other only via the BT communication when the operation unit of the remote control apparatus is unoperated for a predetermined time period or more.

According to this configuration, it is possible to achieve reduction in power consumption by changing the communication mode depending on the set mode in a communication apparatus that uses a plurality of communication paths together.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 Video camera
20 Remote control
21 Display unit
22 Operation unit
50 Video camera-incorporated capsule
70 PC
101 Control unit
102 Image pickup unit
103 Display unit
104 Input unit (operation unit)
105 Output unit
106 Storage unit
107 Communication unit
108 Time measuring unit
201 Control unit
202 Display unit
203 Input unit (operation unit)
204 Output unit
205 Storage unit
206 Communication unit
207 Time measuring unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. A non-transitory computer-readable medium storing program code for communications by an information processing apparatus including a communication circuitry, an operation circuitry, and an electronic processor that, when executing the program code, causes the electronic processor to perform a set of operations comprising:
  controlling the communication circuitry in a first communication state to communicate with an image pickup apparatus;
  controlling the communication circuitry to switch from the first communication state to a second communication state to communicate with the image pickup apparatus, depending on an operation of the operation circuitry, the second communication state having a higher power consumption than the first communication state; and
  controlling a display circuitry to display recording process execution information with respect to the image pickup apparatus, the recording process execution information indicating whether an execution of a recording process is occurring at the image pickup apparatus.

2. The non-transitory computer-readable medium according to claim 1, wherein the first communication state is an image non-display mode and the second communication state is an image display mode, and wherein the operation is a user touch operation that controls the communication circuitry to receive a captured image from the image pickup apparatus while the image pickup apparatus is capturing images and controls the display circuitry to display the captured image from the image pickup apparatus while the image pickup apparatus is capturing the images.

3. The non-transitory computer-readable medium according to claim 1, wherein the first communication state is communications via a first communication path, and wherein the second communication state is communications via a second communication path.

4. The non-transitory computer-readable medium according to claim 3, wherein the first communication path is a Bluetooth® communication path and the second communication path is a Wi-Fi communication path.

5. The non-transitory computer-readable medium according to claim 1, wherein the set of operations further includes
controlling the display circuitry to display communication state information; and
controlling the display circuitry to display battery state information.

6. The non-transitory computer-readable medium according to claim 5, wherein controlling the display circuitry to display the communication state information further includes controlling the display circuitry to display the communication state information on an upper area of the display circuitry, and
wherein controlling the display circuitry to display the battery state information further includes controlling the display circuitry to display the battery state information on the upper area of the display circuitry.

7. The non-transitory computer-readable medium according to claim 5, wherein the communication state information is indicative of a communication state between the communication circuitry and the image pickup apparatus.

8. The non-transitory computer-readable medium according to claim 5, wherein the set of operations further includes
controlling the communication circuitry to request the battery state information from the image pickup apparatus via one of a first communication path or a second communication path; and
controlling the communication circuitry to receive the battery state information from the image pickup apparatus via the one of the first communication path or the second communication path,
wherein the battery state information is indicative of a battery state of the image pickup apparatus.

9. The non-transitory computer-readable medium according to claim 1, wherein the set of operations further includes
controlling the communication circuitry to request recording mode information from the image pickup apparatus via one of a first communication path or a second communication path;
controlling the communication circuitry to receive the recording mode information from the image pickup apparatus via the one of the first communication path or the second communication path; and
controlling the display circuitry to display the recording mode information.

10. The non-transitory computer-readable medium according to claim 1, wherein the set of operations further includes
controlling the communication circuitry to transmit operation information to the image pickup apparatus during the second communication state.

11. A method comprising:
controlling, with a control circuitry, a communication circuitry in a first communication state to communicate with an image pickup apparatus;
controlling, with the control circuitry, the communication circuitry to switch from the first communication state to a second communication state to communicate with the image pickup apparatus, depending on an operation of an operation circuitry, the second communication state having a higher power consumption than the first communication state; and
controlling, with the control circuitry, a display circuitry to display recording process execution information with respect to the image pickup apparatus, the recording process execution information indicating whether an execution of a recording process is occurring at the image pickup apparatus.

12. The method according to claim 11, wherein the first communication state is an image non-display mode and the second communication state is an image display mode, and wherein the operation is a user touch operation that controls the communication circuitry to receive a captured image from the image pickup apparatus while the image pickup apparatus is capturing images and controls the display circuitry to display the captured image from the image pickup apparatus while the image pickup apparatus is capturing the images.

13. The method according to claim 11, wherein the first communication state is communications via a first communication path, and wherein the second communication state is communications via a second communication path.

14. The method according to claim 13, wherein the first communication path is a Bluetooth® communication path and the second communication path is a Wi-Fi communication path.

15. The method according to claim 11, further comprising:
controlling the display circuitry to display communication state information; and
controlling the display circuitry to display battery state information.

16. The method according to claim 15, wherein controlling the display circuitry to display the communication state information further includes controlling the display circuitry to display the communication state information on an upper area of the display circuitry, and
wherein controlling the display circuitry to display the battery state information further includes controlling the display circuitry to display the battery state information on the upper area of the display circuitry.

17. The method according to claim 15, wherein the communication state information is indicative of a communication state between the communication circuitry and the image pickup apparatus.

18. The method according to claim 15, further comprising:
controlling the communication circuitry to request the battery state information from the image pickup apparatus via one of a first communication path or a second communication path; and
controlling the communication circuitry to receive the battery state information from the image pickup apparatus via the one of the first communication path or the second communication path,
wherein the battery state information is indicative of a battery state of the image pickup apparatus.

19. The method according to claim 11, further comprising:
controlling the communication circuitry to transmit operation information to the image pickup apparatus during the second communication state.

20. A system comprising:
display circuitry;
an image pickup apparatus that performs image pickup processing; and
an information processing apparatus including a communication circuitry, an operation circuitry, and an electronic processor configured to:

control the communication circuitry in a first communication state to communicate with the image pickup apparatus,
control the communication circuitry to switch from the first communication state to a second communication state to communicate with the image pickup apparatus, depending on an operation of the operation circuitry, the second communication state having a higher power consumption than the first communication state, and
control the display circuitry to display recording process execution information with respect to the image pickup apparatus, the recording process execution information indicating whether an execution of a recording process is occurring at the image pickup apparatus.

* * * * *